United States Patent
Chen et al.

(10) Patent No.: US 11,706,763 B2
(45) Date of Patent: Jul. 18, 2023

(54) D2D RESOURCE CONFIGURATION OR ALLOCATION METHODS AND APPARATUSES

(71) Applicant: ZTE Corporation, Guangdong (CN)

(72) Inventors: Lin Chen, Shenzhen (CN); Yuqin Chen, Shenzhen (CN); Yin Gao, Shenzhen (CN); Dapeng Li, Shenzhen (CN); Ying Huang, Shenzhen (CN); Parolari Sergio, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 15 days.

(21) Appl. No.: 16/878,202

(22) Filed: May 19, 2020

(65) Prior Publication Data

US 2020/0280977 A1    Sep. 3, 2020

Related U.S. Application Data

(63) Continuation of application No. 15/502,015, filed as application No. PCT/CN2015/077009 on Apr. 20, 2015, now abandoned.

(30) Foreign Application Priority Data

May 8, 2014   (CN) .......................... 201410193884.7
Aug. 7, 2014  (CN) .......................... 201410386969.7

(51) Int. Cl.
*H04W 72/20*    (2023.01)
*H04W 4/70*     (2018.01)
(Continued)

(52) U.S. Cl.
CPC ............. *H04W 72/20* (2023.01); *H04W 4/70* (2018.02); *H04W 72/51* (2023.01); *H04W 76/11* (2018.02);
(Continued)

(58) Field of Classification Search
CPC .. H04L 67/16; H04W 72/02; H04W 72/0406; H04W 72/048; H04W 72/085;
(Continued)

(56) References Cited

U.S. PATENT DOCUMENTS

| 9,084,241 B2 * | 7/2015 | Madan .................. H04W 76/14 |
| 2013/0230015 A1 | 9/2013 | Hoymann et al. |

(Continued)

FOREIGN PATENT DOCUMENTS

| CN | 102638893 A | 8/2012 |
| CN | 103179575 A | 6/2013 |

(Continued)

OTHER PUBLICATIONS

International Preliminary Report on Patentability on PCT/CN2015/077009 dated Nov. 8, 2016 (4 pages).
(Continued)

*Primary Examiner* — Thomas J Dailey
(74) *Attorney, Agent, or Firm* — Foley & Lardner LLP

(57) ABSTRACT

Device-to-Device (D2D) resource configuration or allocation methods and apparatuses are provided. The D2D resource configuration method includes the following steps. A User Equipment (UE) receives D2D resource configuration information sent by a D2D control node. The UE configures D2D resources according to the D2D resource configuration information. The technical solution implements D2D resource configuration for a D2D UE.

18 Claims, 8 Drawing Sheets

(51) Int. Cl.
    *H04W 72/51* (2023.01)
    *H04W 76/11* (2018.01)
    *H04L 67/51* (2022.01)
    *H04W 72/56* (2023.01)
    *H04W 72/542* (2023.01)
    *H04W 76/14* (2018.01)
    *H04W 72/02* (2009.01)

(52) U.S. Cl.
    CPC ............ *H04L 67/51* (2022.05); *H04W 72/02* (2013.01); *H04W 72/542* (2023.01); *H04W 72/56* (2023.01); *H04W 76/14* (2018.02); *Y02D 30/70* (2020.08)

(58) Field of Classification Search
    CPC ..... H04W 72/10; H04W 76/11; H04W 76/14; Y02D 30/70
    See application file for complete search history.

(56) References Cited

U.S. PATENT DOCUMENTS

| | | |
|---|---|---|
| 2013/0242866 A1 | 9/2013 | Lin et al. |
| 2013/0244661 A1 | 9/2013 | Lin et al. |
| 2013/0288645 A1 | 10/2013 | Zheng |
| 2013/0301438 A1* | 11/2013 | Li .......................... H04L 5/0035 370/252 |
| 2014/0010172 A1 | 1/2014 | Wei et al. |
| 2015/0071212 A1* | 3/2015 | Kim .................... H04W 72/042 370/329 |
| 2016/0014831 A1 | 1/2016 | Lee et al. |

FOREIGN PATENT DOCUMENTS

| | | |
|---|---|---|
| CN | 103209487 A | 7/2013 |
| CN | 103686691 A | 3/2014 |
| WO | WO-2013/177179 A1 | 11/2013 |

OTHER PUBLICATIONS

International Search Report and Written Opinion of the International Searching Authority on PCT/CN2015/077009 dated Jul. 17, 2015 (10 pages).
US Office Action on U.S. Appl. No. 15/502,015 dated Apr. 4, 2019 (17 pages).
US Office Action on U.S. Appl. No. 15/502,015 dated Feb. 19, 2020 (13 pages).
US Office Action on U.S. Appl. No. 15/502,015 dated Oct. 4, 2019 (18 pages).

* cited by examiner

PRIOR ART

D2D RESOURCE CONFIGURATION OR ALLOCATION METHODS AND APPARATUSES

CROSS REFERENCE TO RELATED APPLICATIONS

This application claims the benefit of priority under 35 U.S.C. § 120 as a continuation of U.S. patent application Ser. No. 15/502,015, filed on Jun. 22, 2017, which claims the benefit of priority under 35 U.S.C. § 371 to International Patent Application number PCT/CN2015/077009, filed on Apr. 20, 2015, which claims the benefit of priority to Chinese Patent Application Number 201410386969.7, filed on Aug. 7, 2014, and Chinese Patent Application Number 201410193884.7, filed on May 8, 2014, the disclosure of each of which is incorporated herein by reference in its entirety.

TECHNICAL FIELD

The present disclosure relates to the field of communications, and in particular to Device-to-Device (D2D) resource configuration or allocation methods and apparatuses.

BACKGROUND

With the development of wireless multimedia services, demands of people for high data rate and good user experience are increasing, thereby raising a higher requirement for system capacity and coverage of a traditional cellular network. In another aspect, due to application scenarios such as public security, social networking, near-field data sharing and local advertising, demands of people for getting to know and further communicating (via proximity services) with surrounding people or things are increasing. The traditional cellular network mainly based on base stations (may be embodied as evolved node B (eNB)) has obvious limitations in supporting of high data rate and proximity services. Facing these demands, a D2D technology representative of a new development direction of a future communication technology emerges. Application of the D2D technology can alleviate burdens to the cellular network, reduce the power consumption of a battery of a User Equipment (UE), increase the data rate, improve the robustness of a network infrastructure, and well meet the requirements for the high data rate services and the proximity services.

The D2D technology can work on a licensed band or unlicensed band to allow a plurality of D2D UEs supporting a D2D function to perform direct discovery/direct communication in the presence or absence of a network infrastructure. There are mainly three D2D application scenarios.

(1) UE1 and UE2 perform data interaction under the coverage of a cellular network, while user plane data does not pass through the network infrastructure, as Mode 1 in FIG. 1.

(2) Relay transmission is performed for a UE in a weak-coverage/non-coverage area, as Mode 2 in FIG. 1. UE4 poor in signal quality is enabled to communicate with a network by means of a UE3 nearby which is in the coverage of the network.

By virtue of this mode, an operator can be assisted in coverage expansion and capacity increase.

(3) When a cellular network cannot normally work in case of an earthquake or emergency, direct communication between devices is enabled, as mode 3 in FIG. 1. UE5, UE6 and UE7 can perform one-hop or multi-hop data communication in both the control plane and the user plane without a network infrastructure.

A D2D technology usually includes a D2D discovery technology and a D2D communication technology. The D2D discovery technology refers to a technology for judging/determining whether UEs are in proximity to each other. Usually, D2D UEs can discover each other by sending or receiving discovery information or a discovery signal. The D2D communication technology refers to a technology capable of performing direct communication for some or all communication data between the D2D UEs without a network infrastructure.

There are generally two modes for allocating resources for D2D discovery or D2D communication according to the progress of existing 3GPP standard conferences. A first resource allocation mode is contention-based resource acquisition for the resources of D2D discovery/communication. A second resource allocation mode is to allocate dedicated resources of D2D discovery/communication for a UE by a base station. In the first resource allocation mode, a base station or a system usually pre-allocates a D2D resource pool, and a D2D UE participating in D2D discovery/communication monitors the resource pool and acquires D2D transmission resources in a contention manner. In the second resource allocation mode, a base station allocates appropriate D2D resources for a UE in response to requests of the UE.

However, a systematic and complete solution for a D2D resource allocation method for a specific D2D UE is not provided in the related art.

SUMMARY

Some embodiments of the present disclosure provide D2D resource configuration or allocation methods and apparatuses, which are intended to at least solve the problem of how to configure D2D resources.

According to an aspect of the embodiments of the present disclosure, a D2D resource configuration method is provided. In the D2D resource configuration method, a UE receives D2D resource configuration information sent by a D2D control node; and the UE configures D2D resources according to the D2D resource configuration information.

In an exemplary embodiment of the present disclosure, before the UE receives the D2D resource configuration information sent by the D2D control node, the method may further include one of the following steps. The UE sends a message containing D2D resource configuration request information to the D2D control node. The UE sends a message containing D2D resource reconfiguration request information to the D2D control node. The UE sends a message containing D2D resource release request information to the D2D control node.

In an exemplary embodiment of the present disclosure, before the UE sends the message containing the D2D resource configuration request information to the D2D control node, the method may further include that: the UE receives a D2D indication, broadcast by the D2D control node, of a cell and/or a neighbouring cell corresponding to the D2D control node.

In an exemplary embodiment of the present disclosure, the D2D indication may include at least one of: a D2D communication indication for indicating whether a base station supports D2D communication, and a D2D discovery indication for indicating whether a base station supports D2D discovery.

In an exemplary embodiment of the present disclosure, after the UE receives the D2D resource configuration information sent by the D2D control node, the method may further include that: the UE sends D2D resource configuration completion to the D2D control node.

In an exemplary embodiment of the present disclosure, the D2D control node may include: a base station, a UE executing a resource configuration function, or a relay node.

In an exemplary embodiment of the present disclosure, the D2D resource configuration information may include at least one of: D2D configuration setup information corresponding to a resource allocation mode; D2D configuration modification information corresponding to a resource allocation mode; and D2D configuration release information corresponding to a resource allocation mode.

In an exemplary embodiment of the present disclosure, the resource allocation mode may include: a first resource allocation mode in which at least one D2D resource pool is allocated for a UE; and/or a second resource allocation mode in which dedicated D2D resource is allocated for a UE.

In an exemplary embodiment of the present disclosure, the D2D resource configuration information corresponding to the first resource allocation mode may include one or any combination of: first resource configuration indication, D2D discovery/communication indication, validity period of first resource configuration, priority of first resource configuration, D2D resource pool information, which corresponds to the first resource allocation mode, of a serving cell, and D2D resource pool information, which corresponds to the first resource allocation mode, of one or more neighbouring cells.

In an exemplary embodiment of the present disclosure, the D2D resource configuration information corresponding to the second resource allocation mode may include one or any combination of: a second resource configuration indication, a D2D discovery/communication indication, a validity period of second resource configuration, a priority of second resource configuration, D2D transmission resource information, which corresponds to the second resource allocation mode, of a serving cell, D2D resource pool information, which corresponds to a second resource allocation mode, of one or more neighbouring cells, a D2D Cell Radio Network Temporary Identity, a D2D Semi-Persistent Cell Radio Network Temporary Identity, a D2D semi-persistent scheduling interval, a D2D semi-persistent scheduling frame and/or subframe offset, and a D2D semi-persistent scheduling subframe mode.

In an exemplary embodiment of the present disclosure, the D2D resource pool information may include: a D2D discovery resource pool and/or a D2D communication resource pool.

In an exemplary embodiment of the present disclosure, the D2D communication resource pool may include: a D2D control information resource pool and/or a D2D data resource pool. In the embodiment, D2D control information includes D2D scheduling allocation information.

In an exemplary embodiment of the present disclosure, the D2D resource pool information may include at least one of: a D2D subframe mode, a D2D resource period, a D2D frame and/or subframe offset, and a D2D resource time and frequency domain position.

In an exemplary embodiment of the present disclosure, the D2D resource pool may include: a D2D transmission resource pool and/or a D2D reception resource pool.

In an exemplary embodiment of the present disclosure, the D2D resource configuration request information may include one or any combination of: a D2D discovery/communication indication, a D2D capability/inclination indication of a UE, a D2D communication group identifier, a UE priority, a bearer priority of a UE, a logic channel priority of a UE, a periodicity/one-shot indication, a duration, a measurement result of resources corresponding to a resource allocation mode, a cellular radio resource management measurement result, and a resource type.

In an exemplary embodiment of the present disclosure, the resource type may include at least one of: transmission resource/resource pool information of a serving cell, reception resource/resource pool information of a serving cell, transmission resource/resource pool information of one or more neighbouring cells, and reception resource/resource pool information of one or more neighbouring cells. In this embodiment, the transmission resource/resource pool information or the reception resource/resource pool information is divided into first resource configuration information and second resource configuration information.

In an exemplary embodiment of the present disclosure, the D2D capability/inclination indication of the UE may include: a resource allocation mode supported/inclined to use by the UE.

In an exemplary embodiment of the present disclosure, the method may further include that: a message containing configuration failure information is received from the D2D control node.

In an exemplary embodiment of the present disclosure, the configuration failure information may include at least one of: a cause for configuration failure; and a waitable timer, indicating that a UE is not allowed to repeatedly send the D2D resource configuration request before the waitable timer expires.

In an exemplary embodiment of the present disclosure, the cause for the configuration failure may include at least one of: non-passed authorization validation, no available resources, non-support of D2D for a D2D control node, and capability limitation of a UE.

In an exemplary embodiment of the present disclosure, the step that the UE configures the D2D resources according to the D2D resource configuration information may include one of the following steps.

When the D2D resource configuration information contains D2D transmission resource configuration setup and/or modification information corresponding to the first resource allocation mode, for D2D discovery, the UE in a connected state acquires D2D resources for D2D transmission in a contention-based way according to D2D transmission resource pool information corresponding to the first resource allocation mode; when receiving D2D transmission resource pool information corresponding to the first resource allocation mode or when entering an idle state, the UE starts a validity timer for D2D transmission resource configuration corresponding to the first resource allocation mode, before the timer expires, the UE continues acquiring D2D resources for D2D transmission in the contention-based way according to the D2D transmission resource pool corresponding to the first resource allocation mode, and after the timer expires, the UE releases D2D transmission resource configuration corresponding to the first resource allocation mode.

When the D2D resource configuration information contains D2D transmission resource configuration setup and/or modification information corresponding to the first resource allocation mode, for D2D communication, the UE acquires D2D resources for D2D communication in a contention-based way according to a D2D transmission resource pool corresponding to the first resource allocation mode.

When the D2D resource configuration information contains D2D transmission resource configuration setup and/or modification information corresponding to the second resource allocation mode, for D2D discovery, the UE acquires D2D resources for D2D discovery message transmission according to D2D transmission resources corresponding to the second resource allocation mode.

When the D2D resource configuration information contains D2D transmission resource configuration setup and/or modification information corresponding to the second resource allocation mode, for D2D communication, the UE initiates a D2D scheduling request or a D2D buffer state report, or the UE waits for the D2D control node to send D2D resource grant or D2D semi-persistent scheduling activation information.

When the D2D resource configuration information contains D2D reception resource configuration setup and/or modification information corresponding to the first resource allocation mode and/or the second resource allocation mode, the UE monitors a D2D reception resource pool corresponding to the first resource allocation mode and/or the second resource allocation mode.

When the D2D resource configuration information contains D2D reception resource configuration setup and/or modification information corresponding to the first resource allocation mode and/or the second resource allocation mode, for D2D discovery, the UE in a connected state performs D2D transmission by using D2D transmission resources corresponding to the second resource allocation mode; when receiving D2D transmission resource pool information corresponding to the first resource allocation mode or when entering an idle state, the UE starts a validity timer for D2D transmission resource configuration corresponding to the first resource allocation mode, before the timer expires, the UE acquires D2D resources for D2D transmission in a contention-based way according to a D2D transmission resource pool corresponding to the first resource allocation mode, and after the timer expires, the UE releases D2D transmission resource configuration corresponding to the first resource allocation mode.

When the D2D resource configuration information contains D2D reception resource configuration setup and/or modification information corresponding to the first resource allocation mode and/or the second resource allocation mode, for D2D communication, the UE selects a high-priority resource configuration mode for D2D communication. For example, when the cell radio resource management measurement result is higher than a preconfigured threshold, D2D transmission resources corresponding to the second resource allocation mode have a high priority, and when the cell radio resource management measurement result is lower than the preconfigured threshold, D2D transmission resources corresponding to the first resource allocation mode have a high priority.

When the D2D resource configuration information contains D2D resource configuration release information corresponding to the first resource allocation mode and/or the second resource allocation mode, the UE releases D2D resource configuration information corresponding to the first resource allocation mode and/or the second resource allocation mode.

According to another aspect of the embodiments of the present disclosure, a D2D resource allocation method is provided, which may include that: a D2D control node sends D2D resource configuration information to a UE.

In an exemplary embodiment of the present disclosure, the D2D control node may include: a base station, a UE executing a resource configuration function, or a relay node.

In an exemplary embodiment of the present disclosure, the D2D resource configuration information may include at least one of: D2D configuration setup information corresponding to a resource allocation mode; D2D configuration modification information corresponding to a resource allocation mode; and D2D configuration release information corresponding to a resource allocation mode.

In an exemplary embodiment of the present disclosure, the resource allocation mode may include: a first resource allocation mode in which at least one D2D resource pool is allocated for a UE; and/or a second resource allocation mode in which dedicated D2D resource is allocated for a UE.

In an exemplary embodiment of the present disclosure, the D2D resource configuration information corresponding to the first resource allocation mode may include one or any combination of: first resource configuration indication, D2D discovery/communication indication, validity period of first resource configuration, priority of first resource configuration, D2D resource pool information, which corresponds to the first resource allocation mode, of a serving cell, and D2D resource pool information, which corresponds to the first resource allocation mode, of one or more neighbouring cells.

In an exemplary embodiment of the present disclosure, the D2D resource configuration information corresponding to the second resource allocation mode may include one or any combination of: a second resource configuration indication, a D2D discovery/communication indication, a validity period of second resource configuration, a priority of second resource configuration, D2D transmission resource information, which corresponds to the second resource allocation mode, of a serving cell, D2D resource pool information, which corresponds to a second resource allocation mode, of one or more neighbouring cells, a D2D Cell Radio Network Temporary Identity, a D2D Semi-Persistent Cell Radio Network Temporary Identity, a D2D semi-persistent scheduling interval, a D2D semi-persistent scheduling frame and/or subframe offset, and a D2D semi-persistent scheduling subframe mode.

In an exemplary embodiment of the present disclosure, the D2D resource pool information may include: a D2D discovery resource pool and/or a D2D communication resource pool.

In an exemplary embodiment of the present disclosure, the D2D communication resource pool may include: a D2D control information resource pool and/or a D2D data resource pool. In the embodiment, D2D control information includes D2D scheduling allocation information.

In an exemplary embodiment of the present disclosure, the D2D resource pool information may include at least one of: a D2D subframe mode, a D2D resource period, a D2D frame and/or subframe offset, and a D2D resource time and frequency domain position.

In an exemplary embodiment of the present disclosure, the D2D resource pool may include: a D2D transmission resource pool and/or a D2D reception resource pool.

In an exemplary embodiment of the present disclosure, before the D2D control node sends the D2D resource configuration information to the UE, the method may further include one of the following steps. The D2D control node receives a message containing D2D resource configuration request information from the UE. The D2D control node receives a message containing D2D resource reconfiguration request information from the UE. The D2D control node receives a message containing D2D resource release request information from the UE.

In an exemplary embodiment of the present disclosure, before the D2D control node receives the message containing the D2D resource configuration request information from the UE, the method may further include that: the D2D control node broadcasts a D2D indication of a cell and/or a neighbouring cell corresponding to the D2D control node.

In an exemplary embodiment of the present disclosure, the D2D indication may include at least one of: a D2D communication indication for indicating whether a base station supports D2D communication, and a D2D discovery indication for indicating whether a base station supports D2D discovery.

In an exemplary embodiment of the present disclosure, before the D2D control node sends the D2D configuration release information to the UE, the method may further include at least one of the following steps. The D2D control node receives a message containing D2D resource release information from the UE. A D2D resource pool, which corresponds to a second resource allocation mode, of the D2D control node is updated, and it is determined that affected D2D resources allocated by to UE need to be released. The D2D control node determines that capability and/or authorization information of the UE changes, and configured D2D resources are not allowed to be used anymore. When resources, which correspond to a second resource allocation mode, of a low-priority UE are pre-empted, the D2D control node determines that the D2D resources corresponding to the second resource allocation mode allocated for the low-priority UE need to be released.

In an exemplary embodiment of the present disclosure, before the D2D control node sends the D2D configuration modification information to the UE, the method may further include at least one of the following steps. The D2D control node receives a message containing D2D resource configuration/reconfiguration request information from the UE. When a D2D resource pool, which corresponds to the first resource allocation mode and/or the second resource allocation mode, of the D2D control node is updated, it is determined that affected D2D resources allocated to the UE need to be modified.

In an exemplary embodiment of the present disclosure, the step that the D2D control node sends the D2D resource configuration information to the UE may include that: the D2D control node judges whether to configure D2D resources for the UE; and when the D2D control node judges to configure the D2D resources for the UE, D2D resources are configured for the UE, and D2D resource configuration information of the configured D2D resources is sent to the UE.

In an exemplary embodiment of the present disclosure, the method may further include that: when the D2D control node judges not to configure the D2D resources for the UE, a message containing configuration failure information is sent to the UE.

In an exemplary embodiment of the present disclosure, the configuration failure information may include at least one of: a cause for configuration failure; and a prohibition timer, indicating that the UE is not allowed to repeatedly send a corresponding D2D request before the prohibition timer expires.

In an exemplary embodiment of the present disclosure, the cause for the configuration failure may include at least one of: non-passed authorization validation, no available resources, non-support of D2D for a D2D control node, and capability limitation of a UE.

In an exemplary embodiment of the present disclosure, the step that the D2D control node judges whether to configure the D2D resources for the UE may include that: the D2D control node judges whether to configure the D2D resources for the UE according to at least one of a D2D resource load, a D2D authorization indication of the UE, a D2D capability/inclination indication of the UE, a UE priority, a bearer priority of the UE, and a logic channel priority of the UE.

In an exemplary embodiment of the present disclosure, the D2D control node may judge, according to a pre-acquired D2D authorization indication of the UE, whether the UE passes D2D resource configuration authorization and which type of D2D resources is authorized to be used by the UE.

In an exemplary embodiment of the present disclosure, the D2D control node may determine, according to a pre-acquired D2D capability/inclination indication of the UE, which type of D2D resources is to be used by the UE.

In an exemplary embodiment of the present disclosure, the D2D capability/inclination indication of the UE may include: a resource allocation mode supported/inclined to use by the UE.

In an exemplary embodiment of the present disclosure, the D2D control node may configure the D2D resources for the UE according to a D2D resource load. When D2D resources corresponding to a second resource allocation mode do not have enough available resources, the D2D control node configures D2D resources corresponding to a first resource allocation mode for the UE. In this embodiment, the first resource allocation mode is a resource allocation mode in which at least one D2D resource pool is allocated for the UE, and the second resource allocation mode is a resource allocation mode in which dedicated D2D resource is allocated for the UE.

In an exemplary embodiment of the present disclosure, the D2D control node may configure the D2D resources for the UE according to a D2D resource load. When D2D resources corresponding to a second resource allocation mode do not have enough available resources, it is judged whether a priority of the UE and/or a bearer priority of the UE satisfy/satisfies predetermined conditions. When the predetermined conditions are satisfied, the D2D control node pre-empts D2D resources, which correspond to a second resource allocation mode, of a low-priority UE and/or a low-bearer-priority UE. When the predetermined conditions are not satisfied, D2D resources corresponding to a first resource allocation mode are configured for the UE. In this embodiment, the first resource allocation mode is a resource allocation mode in which at least one D2D resource pool is allocated for the UE, and the second resource allocation mode is a resource allocation mode in which dedicated D2D resource is allocated for the UE.

According to still another aspect of the embodiments of the present disclosure, a D2D resource configuration apparatus is provided, which may include a receiving module and a configuration module. The receiving module is arranged to receive D2D resource configuration information sent by a D2D control node. The configuration module is arranged to configure D2D resources according to the D2D resource configuration information.

In an exemplary embodiment of the present disclosure, the apparatus may further include a first sending module. The first sending module is arranged to send one of: a message containing D2D resource configuration request information, a message containing D2D resource reconfiguration request information, and a message containing D2D resource release request information.

In an exemplary embodiment of the present disclosure, the apparatus may further include a second sending module.

The second sending module is arranged to send D2D resource configuration completion to the D2D control node.

In an exemplary embodiment of the present disclosure, the D2D control node may include: a base station, a UE executing a resource configuration function, or a relay node.

In an exemplary embodiment of the present disclosure, the D2D resource configuration information may include at least one of: D2D configuration setup information corresponding to a resource allocation mode; D2D configuration modification information corresponding to a resource allocation mode; and D2D configuration release information corresponding to a resource allocation mode.

In an exemplary embodiment of the present disclosure, the resource allocation mode may include: a first resource allocation mode in which at least one D2D resource pool is allocated for a UE; and/or a second resource allocation mode in which dedicated D2D resource is allocated for a UE.

In an exemplary embodiment of the present disclosure, the D2D resource configuration information corresponding to the first resource allocation mode may include one or any combination of: first resource configuration indication, D2D discovery/communication indication, validity period of first resource configuration, priority of first resource configuration, D2D resource pool information, which corresponds to the first resource allocation mode, of a serving cell, and D2D resource pool information, which corresponds to the first resource allocation mode, of one or more neighbouring cells.

In an exemplary embodiment of the present disclosure, the D2D resource configuration information corresponding to the second resource allocation mode may include one or any combination of: a second resource configuration indication, a D2D discovery/communication indication, a validity period of second resource configuration, a priority of second resource configuration, D2D transmission resource information, which corresponds to the second resource allocation mode, of a serving cell, D2D resource pool information, which corresponds to a second resource allocation mode, of one or more neighbouring cells, a D2D Cell Radio Network Temporary Identity, a D2D Semi-Persistent Cell Radio Network Temporary Identity, a D2D semi-persistent scheduling interval, a D2D semi-persistent scheduling frame and/or subframe offset, and a D2D semi-persistent scheduling subframe mode.

In an exemplary embodiment of the present disclosure, the D2D resource pool information may include: a D2D discovery resource pool and/or a D2D communication resource pool.

In an exemplary embodiment of the present disclosure, the D2D resource configuration request information may include one or any combination of: a D2D discovery/communication indication, a D2D capability/inclination indication of a UE, a D2D communication group identifier, a UE priority, a bearer priority of a UE, a logic channel priority of a UE, a periodicity/one-shot indication, a duration, a measurement result of resources corresponding to a resource allocation mode, a cellular radio resource management measurement result, and a resource type.

In an exemplary embodiment of the present disclosure, the resource type may include at least one of: transmission resource/resource pool information of a serving cell, reception resource/resource pool information of a serving cell, transmission resource/resource pool information of one or more neighbouring cells, and reception resource/resource pool information of one or more neighbouring cells. In this embodiment, the transmission resource/resource pool information or the reception resource/resource pool information is divided into first resource configuration information and second resource configuration information.

In an exemplary embodiment of the present disclosure, the D2D capability/inclination indication of the UE may include: a resource allocation mode supported/inclined to use by the UE.

In an exemplary embodiment of the present disclosure, the configuration module may be arranged to perform one of the following processing.

When the D2D resource configuration information contains D2D transmission resource configuration setup and/or modification information corresponding to the first resource allocation mode, for D2D discovery, the UE in a connected state acquires D2D resources for D2D transmission in a contention-based way according to D2D transmission resource pool information corresponding to the first resource allocation mode; when receiving D2D transmission resource pool information corresponding to the first resource allocation mode or when entering an idle state, the UE starts a validity timer for D2D transmission resource configuration corresponding to the first resource allocation mode, before the timer expires, the UE continues acquiring D2D resources for D2D transmission in the contention-based way according to the D2D transmission resource pool corresponding to the first resource allocation mode, and after the timer expires, the UE releases D2D transmission resource configuration corresponding to the first resource allocation mode.

When the D2D resource configuration information contains D2D transmission resource configuration setup and/or modification information corresponding to the first resource allocation mode, for D2D communication, the UE acquires D2D resources for D2D communication in a contention-based way according to a D2D transmission resource pool corresponding to the first resource allocation mode.

When the D2D resource configuration information contains D2D transmission resource configuration setup and/or modification information corresponding to the second resource allocation mode, for D2D discovery, the UE acquires D2D resources for D2D discovery message transmission according to D2D transmission resources corresponding to the second resource allocation mode.

When the D2D resource configuration information contains D2D transmission resource configuration setup and/or modification information corresponding to the second resource allocation mode, for D2D communication, the UE initiates a D2D scheduling request or a D2D buffer state report, or the UE waits for the D2D control node to send D2D resource grant or D2D semi-persistent scheduling activation information.

When the D2D resource configuration information contains D2D reception resource configuration setup and/or modification information corresponding to the first resource allocation mode and/or the second resource allocation mode, the UE monitors a D2D reception resource pool corresponding to the first resource allocation mode and/or the second resource allocation mode.

When the D2D resource configuration information contains D2D reception resource configuration setup and/or modification information corresponding to the first resource allocation mode and/or the second resource allocation mode, for D2D discovery, the UE in a connected state performs D2D transmission by using D2D transmission resources corresponding to the second resource allocation mode; when receiving D2D transmission resource pool information corresponding to the first resource allocation mode or when entering an idle state, the UE starts a validity timer for D2D transmission resource configuration corresponding to the first resource allocation mode, before the timer expires, the UE acquires D2D resources for D2D transmission in a contention-based way according to a D2D transmission resource pool corresponding to the first resource allocation mode, and after the timer expires, the UE releases D2D transmission resource configuration corresponding to the first resource allocation mode.

When the D2D resource configuration information contains D2D reception resource configuration setup and/or modification information corresponding to the first resource allocation mode and/or the second resource allocation mode, for D2D communication, the UE selects a high-priority resource configuration mode for D2D communication. For example, when the cell radio resource management measurement result is higher than a preconfigured threshold, D2D transmission resources corresponding to the second resource allocation mode have a high priority, and when the cell radio resource management measurement result is lower than the preconfigured threshold, D2D transmission resources corresponding to the first resource allocation mode have a high priority.

When the D2D resource configuration information contains D2D resource configuration release information corresponding to the first resource allocation mode and/or the second resource allocation mode, the UE releases D2D resource configuration information corresponding to the first resource allocation mode and/or the second resource allocation mode.

According to another aspect of the embodiments of the present disclosure, a D2D resource allocation apparatus is provided, which may be located on a D2D control node and may include a sending module. The sending module is arranged to send D2D resource configuration information to a UE.

In an exemplary embodiment of the present disclosure, the D2D control node may include: a base station, a UE executing a resource configuration function, or a relay node.

In an exemplary embodiment of the present disclosure, the D2D resource configuration information may include at least one of: D2D configuration setup information corresponding to a resource allocation mode; D2D configuration modification information corresponding to a resource allocation mode; and D2D configuration release information corresponding to a resource allocation mode.

In an exemplary embodiment of the present disclosure, the resource allocation mode may include: a first resource allocation mode in which at least one D2D resource pool is allocated for a UE; and/or a second resource allocation mode in which dedicated D2D resource is allocated for a UE.

In an exemplary embodiment of the present disclosure, the D2D resource configuration information corresponding to the first resource allocation mode may include one or any combination of: first resource configuration indication, D2D discovery/communication indication, validity period of first resource configuration, priority of first resource configuration, D2D resource pool information, which corresponds to the first resource allocation mode, of a serving cell, and D2D resource pool information, which corresponds to the first resource allocation mode, of one or more neighbouring cells.

In an exemplary embodiment of the present disclosure, the D2D resource configuration information corresponding to the second resource allocation mode may include one or any combination of: a second resource configuration indication, a D2D discovery/communication indication, a validity period of second resource configuration, a priority of second resource configuration, D2D transmission resource information, which corresponds to the second resource allocation mode, of a serving cell, D2D resource pool information, which corresponds to a second resource allocation mode, of one or more neighbouring cells, a D2D Cell Radio Network Temporary Identity, a D2D Semi-Persistent Cell Radio Network Temporary Identity, a D2D semi-persistent scheduling interval, a D2D semi-persistent scheduling frame and/or subframe offset, and a D2D semi-persistent scheduling subframe mode.

In an exemplary embodiment of the present disclosure, the D2D resource pool information may include: a D2D discovery resource pool and/or a D2D communication resource pool.

In an exemplary embodiment of the present disclosure, the apparatus may further include a receiving module. The receiving module is arranged to receive, from the UE, one of: a message containing D2D resource configuration request information, a message containing D2D resource reconfiguration request information, and a message containing D2D resource release request information.

In an exemplary embodiment of the present disclosure, the apparatus may further include a first determination module. The first determination module is arranged to determine, before the D2D configuration release information is sent to the UE, at least one of the following: receiving a message containing D2D resource release information from the UE; when a D2D resource pool, which corresponds to a second resource allocation mode, of the D2D control node is updated, determining that affected D2D resources allocated by to UE need to be released; determining that capability and/or authorization information of the UE changes, and configured D2D resources are not allowed to be used anymore; and when resources, which correspond to a second resource allocation mode, of a low-priority UE are pre-empted, determining that the D2D resources corresponding to the second resource allocation mode allocated for the low-priority UE need to be released.

In an exemplary embodiment of the present disclosure, the apparatus may further include a second determination module. The second determination module is arranged to determine, before the D2D configuration modification information is sent to the UE, at least one of the following: receiving a message containing D2D resource configuration/reconfiguration request information from the UE; and when a D2D resource pool, which corresponds to the first resource allocation mode and/or the second resource allocation mode, of the D2D control node is updated, determining that affected D2D resources allocated to the UE need to be modified.

In an exemplary embodiment of the present disclosure, the sending module may include a judgement unit and a sending unit. The judgement unit is arranged to judge whether to configure D2D resources for the UE. The sending unit is arranged to, when the judgement unit judges to configure the D2D resources for the UE, configure the D2D resources for the UE, and send D2D resource configuration information of the configured D2D resources to the UE.

In an exemplary embodiment of the present disclosure, the judgement unit may be arranged to judge whether to configure the D2D resources for the UE according to at least one of a D2D resource load, a D2D authorization indication of the UE, a D2D capability/inclination indication of the UE, a UE priority, a bearer priority of the UE, and a logic channel priority of the UE.

In an exemplary embodiment of the present disclosure, the judgement unit may be arranged to judge, according to a pre-acquired D2D authorization indication of the UE, whether the UE passes D2D resource configuration authorization and which type of D2D resources is authorized to be used by the UE.

In an exemplary embodiment of the present disclosure, the judgement unit may be arranged to determine, according to a pre-acquired D2D capability of the UE, which type of D2D resources is to be used by the UE.

In an exemplary embodiment of the present disclosure, the D2D capability of the UE may include: a resource allocation mode supported by the UE.

In an exemplary embodiment of the present disclosure, the judgement unit may be arranged to configure the D2D resources for the UE according to a D2D resource load. When D2D resources corresponding to a second resource allocation mode do not have enough available resources, the D2D control node configures D2D resources corresponding to a first resource allocation mode for the UE. In this embodiment, the first resource allocation mode is a resource allocation mode in which at least one D2D resource pool is allocated for the UE, and the second resource allocation mode is a resource allocation mode in which dedicated D2D resource is allocated for the UE.

In an exemplary embodiment of the present disclosure, the judgement unit may be arranged to configure the D2D resources for the UE according to a D2D resource load. When D2D resources corresponding to a second resource allocation mode do not have enough available resources, it is judged whether a priority of the UE and/or a bearer priority of the UE satisfy/satisfies predetermined conditions. When the predetermined conditions are satisfied, the D2D control node pre-empts D2D resources, which correspond to a second resource allocation mode, of a low-priority UE and/or a low-bearer-priority UE. When the predetermined conditions are not satisfied, D2D resources corresponding to a first resource allocation mode are configured for the UE. In this embodiment, the first resource allocation mode is a resource allocation mode in which at least one D2D resource pool is allocated for the UE, and the second resource allocation mode is a resource allocation mode in which dedicated D2D resource is allocated for the UE.

By means of the embodiments of the present disclosure, a UE receives D2D resource configuration information sent by a D2D control node; and the UE configures D2D resources according to the D2D resource configuration information, thereby implementing D2D resource configuration for a D2D UE.

BRIEF DESCRIPTION OF THE DRAWINGS

The drawings described herein are intended to provide further understanding of the embodiments of the present disclosure, and form a part of the present application. The schematic embodiments and descriptions of the embodiments of the present disclosure are intended to explain the embodiments of the present disclosure, and do not form limitation to the embodiments of the present disclosure. In the drawings.

DETAILED DESCRIPTION OF THE EMBODIMENTS

The embodiments of the present disclosure will be described in detail below with reference to the drawings and the embodiments. It is important to note that the embodiments in the present application and the characteristics in the embodiments may be combined in case of no conflict.

In the following embodiments, the UE may be various types of terminals such as a mobile terminal. The UE may include a processor, a storage medium and other general parts. An operating system of the UE may be various types of operating systems such as Android or iOS. The following embodiments may be implemented by means of a computer program unit. The computer program unit is stored in the storage medium. The processor can execute the computer program unit.

Figure 1:
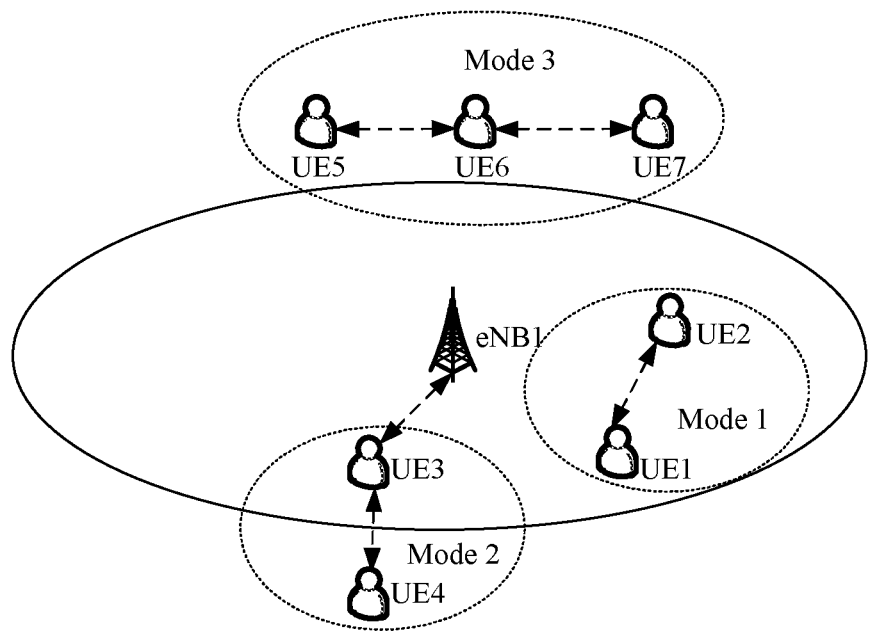
FIG. 1 is a schematic diagram of D2D discovery and communication according to the related art.
Figure 2:
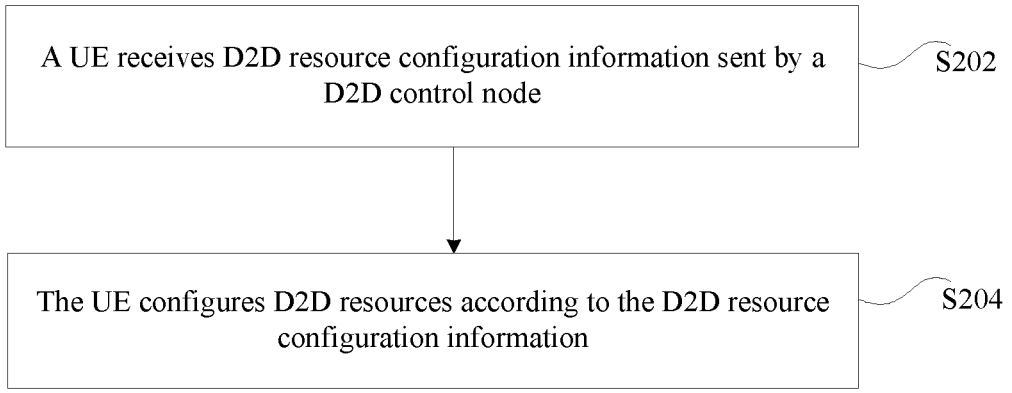
FIG. 2 is a flowchart of a D2D resource configuration method according to an embodiment of the present disclosure.

FIG. 2 is a flowchart of a D2D resource configuration method according to an embodiment of the present disclosure. As shown in FIG. 2, the method includes step S202 to step S204.

At step S202, a UE receives D2D resource configuration information sent by a D2D control node.

In this embodiment, the D2D control node is a node for controlling a D2D process.

In an implementation mode of the embodiments of the present disclosure, the D2D control node may include, but is not limited to, a base station, a UE executing a resource configuration function, or a relay node.

At step S204, the UE configures D2D resources according to the D2D resource configuration information.

In an implementation mode of the embodiments of the present disclosure, before the UE receives the D2D resource configuration information sent by the D2D control node, the method may further include one of the following steps. A message containing D2D resource configuration request information is sent to the D2D control node. A message containing D2D resource reconfiguration request information is sent to the D2D control node. A message containing D2D resource release request information is sent to the D2D control node. In some exemplary embodiments of the present disclosure, each of the above-mentioned requests may be sent by means of the same message or different messages. In addition, the above-mentioned message may be a message dedicated to D2D, or may be a message which is also used for existing communication of the UE.

In an implementation mode of the embodiments of the present disclosure, before the UE sends the message containing the D2D resource configuration request information to the D2D control node, the method further includes that: the UE receives a D2D indication, broadcast by the D2D control node, of a cell and/or a neighbouring cell corresponding to the D2D control node. There may be multiple D2D indications. For example, the D2D indication may include at least one of: a D2D communication indication for indicating whether a base station supports D2D communication, and a D2D discovery indication for indicating whether a base station supports D2D discovery.

In an implementation mode of the embodiments of the present disclosure, after the UE receives the D2D resource configuration information sent by the D2D control node, the UE may also send D2D resource configuration completion to the D2D control node. The D2D resource configuration completion may be carried in an existing message or may be carried in a message dedicated to D2D.

In an implementation mode of the embodiments of the present disclosure, the D2D resource configuration information includes at least one of: D2D configuration setup information corresponding to a resource allocation mode; D2D configuration modification information corresponding to a resource allocation mode; and D2D configuration release information corresponding to a resource allocation mode.

In an implementation mode of the embodiments of the present disclosure, the resource allocation mode includes: a first resource allocation mode in which at least one D2D resource pool is allocated for a UE; and/or a second resource allocation mode in which dedicated D2D resource is allocated for a UE.

In an implementation mode of the embodiments of the present disclosure, the D2D resource configuration information corresponding to the first resource allocation mode includes one or any combination of: first resource configuration indication, D2D discovery/communication indication, validity period of first resource configuration, priority of first resource configuration, D2D resource pool information, which corresponds to the first resource allocation mode, of a serving cell, and D2D resource pool information, which corresponds to the first resource allocation mode, of one or more neighbouring cells.

In an implementation mode of the embodiments of the present disclosure, the D2D resource configuration information corresponding to the second resource allocation mode includes one or any combination of: a second resource configuration indication, a D2D discovery/communication indication, a validity period of second resource configuration, a priority of second resource configuration, D2D transmission resource information, which corresponds to the second resource allocation mode, of a serving cell, D2D resource pool information, which corresponds to a second resource allocation mode, of one or more neighbouring cells, a D2D Cell Radio Network Temporary Identity, a D2D Semi-Persistent Cell Radio Network Temporary Identity, a D2D semi-persistent scheduling interval, a D2D semi-persistent scheduling frame and/or subframe offset, and a D2D semi-persistent scheduling subframe mode.

In an implementation mode of the embodiments of the present disclosure, the D2D resource pool information includes: a D2D discovery resource pool and/or a D2D communication resource pool.

In an implementation mode of the embodiments of the present disclosure, the D2D communication resource pool includes: a D2D control information resource pool and/or a D2D data resource pool. D2D control information includes D2D scheduling allocation information.

In an implementation mode of the embodiments of the present disclosure, the D2D resource pool information includes at least one of: a D2D subframe mode, a D2D resource period, a D2D frame and/or subframe offset, and a D2D resource time and frequency domain position.

In an implementation mode of the embodiments of the present disclosure, the D2D resource pool includes: a D2D transmission resource pool and/or a D2D reception resource pool.

In an implementation mode of the embodiments of the present disclosure, the D2D resource configuration request information includes one or any combination of: a D2D discovery/communication indication, a D2D capability/inclination indication of a UE, a D2D communication group identifier, a UE priority, a bearer priority of a UE, a logic channel priority of a UE, a periodicity/one-shot indication, a duration, a measurement result of resources corresponding to a resource allocation mode, a cellular radio resource management measurement result, and a resource type.

In an implementation mode of the embodiments of the present disclosure, the resource type may include at least one of: transmission resource/resource pool information of a serving cell, reception resource/resource pool information of a serving cell, transmission resource/resource pool information of one or more neighbouring cells, and reception resource/resource pool information of one or more neighbouring cells. In this embodiment, the transmission resource/resource pool information or the reception resource/resource pool information is divided into first resource configuration information and second resource configuration information. That is, the transmission resource/resource pool information of the serving cell is divided into first resource configuration information and second resource configuration information. The transmission resource/resource pool information of the neighbouring cell is divided into first resource configuration information and second resource configuration information.

In an implementation mode of the embodiments of the present disclosure, the D2D capability/inclination indication of the UE includes: a resource allocation mode supported/inclined to use by the UE.

In an implementation mode of the embodiments of the present disclosure, the above-mentioned method further includes that: a message containing configuration failure information is received from the D2D control node.

In an implementation mode of the embodiments of the present disclosure, the configuration failure information includes at least one of: a cause for configuration failure; and a waitable timer, indicating that a UE is not allowed to repeatedly send the D2D resource configuration request before the waitable timer expires.

In an implementation mode of the embodiments of the present disclosure, the cause for the configuration failure includes at least one of: non-passed authorization validation, no available resources, non-support of D2D for a D2D control node, and capability limitation of a UE.

In an implementation mode of the embodiments of the present disclosure, the step that the UE configures the D2D resources according to the D2D resource configuration information includes one of the following steps.

When the D2D resource configuration information contains D2D transmission resource configuration setup and/or modification information corresponding to the first resource allocation mode, for D2D discovery, the UE in a connected state acquires D2D resources for D2D transmission in a contention-based way according to D2D transmission resource pool information corresponding to the first resource allocation mode; when receiving D2D transmission resource pool information corresponding to the first resource allocation mode or when entering an idle state, the UE starts a validity timer for D2D transmission resource configuration corresponding to the first resource allocation mode, before the timer expires, the UE continues acquiring, for D2D discovery, D2D resources for D2D transmission in the contention-based way according to the D2D transmission resource pool corresponding to the first resource allocation mode, and after the timer expires, the UE releases D2D transmission resource configuration corresponding to the first resource allocation mode.

When the D2D resource configuration information contains D2D transmission resource configuration setup and/or modification information corresponding to the first resource allocation mode, for D2D communication, the UE acquires D2D resources for D2D communication in a contention-based way according to a D2D transmission resource pool corresponding to the first resource allocation mode.

When the D2D resource configuration information contains D2D transmission resource configuration setup and/or modification information corresponding to the second resource allocation mode, for D2D discovery, the UE acquires D2D resources for D2D discovery message transmission according to D2D transmission resources corresponding to the second resource allocation mode.

When the D2D resource configuration information contains D2D transmission resource configuration setup and/or modification information corresponding to the second resource allocation mode, for D2D communication, the UE initiates a D2D scheduling request or a D2D buffer state report, or the UE waits for the D2D control node to send D2D resource grant or D2D semi-persistent scheduling activation information.

When the D2D resource configuration information contains D2D reception resource configuration setup and/or modification information corresponding to the first resource allocation mode and/or the second resource allocation mode, the UE monitors a D2D reception resource pool corresponding to the first resource allocation mode and/or the second resource allocation mode.

When the D2D resource configuration information contains D2D reception resource configuration setup and/or modification information corresponding to the first resource allocation mode and/or the second resource allocation mode, for D2D discovery, the UE in a connected state performs D2D transmission by using D2D transmission resources corresponding to the second resource allocation mode; when receiving D2D transmission resource pool information corresponding to the first resource allocation mode or when entering an idle state, the UE starts a validity timer for D2D transmission resource configuration corresponding to the first resource allocation mode, before the timer expires, the UE acquires D2D resources for D2D transmission in a contention-based way according to a D2D transmission resource pool corresponding to the first resource allocation mode, and after the timer expires, the UE releases D2D transmission resource configuration corresponding to the first resource allocation mode.

When the D2D resource configuration information contains D2D reception resource configuration setup and/or modification information corresponding to the first resource allocation mode and/or the second resource allocation mode, for D2D communication, the UE selects a high-priority resource configuration mode for D2D communication. For example, when the cell radio resource management measurement result is higher than a preconfigured threshold, D2D transmission resources corresponding to the second resource allocation mode have a high priority, and when the cell radio resource management measurement result is lower than the preconfigured threshold, D2D transmission resources corresponding to the first resource allocation mode have a high priority.

When the D2D resource configuration information contains D2D resource configuration release information corresponding to the first resource allocation mode and/or the second resource allocation mode, the UE releases D2D resource configuration information corresponding to the first resource allocation mode and/or the second resource allocation mode.

Figure 3:
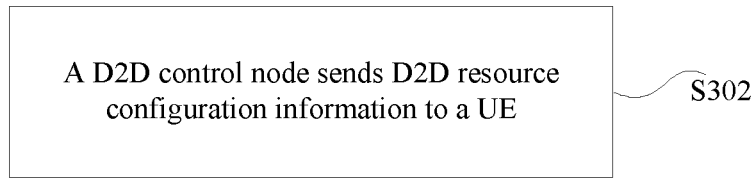
FIG. 3 is a flowchart of a D2D resource allocation method according to an embodiment of the present disclosure.

FIG. 3 is a flowchart of a D2D resource allocation method according to an embodiment of the present disclosure. As shown in FIG. 3, the method includes step S302.

At step S302, a D2D control node sends D2D resource configuration information to a UE.

The D2D control node is a node for controlling a D2D process.

In an implementation mode of the embodiments of the present disclosure, the D2D control node includes, but is not limited to, a base station, a UE executing a resource configuration function, or a relay node.

In an implementation mode of the embodiments of the present disclosure, the D2D resource configuration information includes at least one of: D2D configuration setup information corresponding to a resource allocation mode; D2D configuration modification information corresponding to a resource allocation mode; and D2D configuration release information corresponding to a resource allocation mode.

In an implementation mode of the embodiments of the present disclosure, the resource allocation mode includes: a first resource allocation mode in which at least one D2D resource pool is allocated for a UE; and/or a second resource allocation mode in which dedicated D2D resource is allocated for a UE.

In an implementation mode of the embodiments of the present disclosure, the D2D resource configuration information corresponding to the first resource allocation mode includes one or any combination of: first resource configuration indication, D2D discovery/communication indication, validity period of first resource configuration, priority of first resource configuration, D2D resource pool information, which corresponds to the first resource allocation mode, of a serving cell, and D2D resource pool information, which corresponds to the first resource allocation mode, of one or more neighbouring cells.

In an implementation mode of the embodiments of the present disclosure, the D2D resource configuration information corresponding to the second resource allocation mode includes one or any combination of: a second resource configuration indication, a D2D discovery/communication indication, a validity period of second resource configuration, a priority of second resource configuration, D2D transmission resource information, which corresponds to the second resource allocation mode, of a serving cell, D2D resource pool information, which corresponds to a second resource allocation mode, of one or more neighbouring cells, a D2D Cell Radio Network Temporary Identity, a D2D Semi-Persistent Cell Radio Network Temporary Identity, a D2D semi-persistent scheduling interval, a D2D semi-persistent scheduling frame and/or subframe offset, and a D2D semi-persistent scheduling subframe mode.

In an implementation mode of the embodiments of the present disclosure, the D2D resource pool information includes: a D2D discovery resource pool and/or a D2D communication resource pool.

In an implementation mode of the embodiments of the present disclosure, the D2D communication resource pool includes: a D2D control information resource pool and/or a D2D data resource pool. D2D control information includes D2D scheduling allocation information.

In an implementation mode of the embodiments of the present disclosure, the D2D resource pool information includes at least one of: a D2D subframe mode, a D2D resource period, a D2D frame and/or subframe offset, and a D2D resource time and frequency domain position.

In an implementation mode of the embodiments of the present disclosure, the D2D resource pool includes: a D2D transmission resource pool and/or a D2D reception resource pool.

In an implementation mode of the embodiments of the present disclosure, before the D2D control node sends the D2D resource configuration information to the UE, the method may further include one of the following steps. A message containing D2D resource configuration request information is received from the UE. A message containing D2D resource reconfiguration request information is received from the UE. A message containing D2D resource release request information is received from the UE. In some exemplary embodiments of the present disclosure, each of the above-mentioned requests may be sent by means of the same message or different messages. The above-mentioned message may be an existing message or may be a D2D dedicated message.

In an implementation mode of the embodiments of the present disclosure, before the D2D control node receives the message containing the D2D resource configuration request information from the UE, the method further includes that: the D2D control node broadcasts a D2D indication of a cell and/or a neighbouring cell corresponding to the D2D control node. There may be multiple D2D indications. For example, the D2D indication may include at least one of: a D2D communication indication for indicating whether a base station supports D2D communication, and a D2D discovery indication for indicating whether a base station supports D2D discovery.

In an implementation mode of the embodiments of the present disclosure, before the D2D control node sends the D2D configuration release information to the UE, the method further includes at least one of the following steps. A message containing D2D resource release information is received from the UE. When a D2D resource pool, which corresponds to a second resource allocation mode, of the D2D control node is updated, it is determined that affected D2D resources allocated by to UE need to be released. The D2D control node determines that capability and/or authorization information of the UE changes, and configured D2D resources are not allowed to be used anymore. When resources, which correspond to a second resource allocation mode, of a low-priority UE are pre-empted, the D2D control node determines that the D2D resources corresponding to the second resource allocation mode allocated for the low-priority UE need to be released.

In an implementation mode of the embodiments of the present disclosure, before the D2D control node sends the D2D configuration modification information to the UE, the method further includes at least one of the following steps. The D2D control node receives a message containing D2D resource configuration/reconfiguration request information from the UE. When a D2D resource pool, which corresponds to the first resource allocation mode and/or the second resource allocation mode, of the D2D control node is updated, it is determined that affected D2D resources allocated to the UE need to be modified.

In an implementation mode of the embodiments of the present disclosure, the step that the D2D control node sends the D2D resource configuration information to the UE includes that: the D2D control node judges whether to configure D2D resources for the UE; and when the D2D control node judges to configure the D2D resources for the UE, D2D resources are configured for the UE, and D2D resource configuration information of the configured D2D resources is sent to the UE.

In an implementation mode of the embodiments of the present disclosure, the above-mentioned method may further include that: when the D2D control node judges not to configure the D2D resources for the UE, a message containing configuration failure information is sent to the UE.

In an implementation mode of the embodiments of the present disclosure, the configuration failure information includes at least one of: a cause for configuration failure; and a prohibition timer, indicating that the UE is not allowed to repeatedly send a corresponding D2D request before the prohibition timer expires.

In an implementation mode of the embodiments of the present disclosure, the cause for the configuration failure includes at least one of: non-passed authorization validation, no available resources, non-support of D2D for a D2D control node, and capability limitation of a UE.

In an implementation mode of the embodiments of the present disclosure, the step that the D2D control node judges whether to configure the D2D resources for the UE includes that: the D2D control node judges whether to configure the D2D resources for the UE according to at least one of a D2D resource load, a D2D authorization indication of the UE, a D2D capability/inclination indication of the UE, a UE priority, a bearer priority of the UE, and a logic channel priority of the UE.

In an implementation mode of the embodiments of the present disclosure, the D2D control node judges, according to a pre-acquired D2D authorization indication of the UE, whether the UE passes D2D resource configuration authorization and which type of D2D resources is authorized to be used by the UE.

In an implementation mode of the embodiments of the present disclosure, the D2D control node determines, according to a pre-acquired D2D capability/inclination indication of the UE, which type of D2D resources is to be used by the UE.

In an implementation mode of the embodiments of the present disclosure, the D2D capability/inclination indication of the UE includes: a resource allocation mode supported/inclined to use by the UE.

In an implementation mode of the embodiments of the present disclosure, the D2D control node configures the D2D resources for the UE according to a D2D resource load. When D2D resources corresponding to a second resource allocation mode do not have enough available resources, the D2D control node configures D2D resources corresponding to a first resource allocation mode for the UE.

In an implementation mode of the embodiments of the present disclosure, the D2D control node configures the D2D resources for the UE according to a D2D resource load. When D2D resources corresponding to a second resource allocation mode do not have enough available resources, it is judged whether a priority of the UE and/or a bearer priority of the UE satisfy/satisfies predetermined conditions. When the predetermined conditions are satisfied, the D2D control node pre-empts D2D resources, which correspond to a second resource allocation mode, of a low-priority UE and/or a low-bearer-priority UE. When the predetermined conditions are not satisfied, D2D resources corresponding to a first resource allocation mode are configured for the UE.

Figure 4:
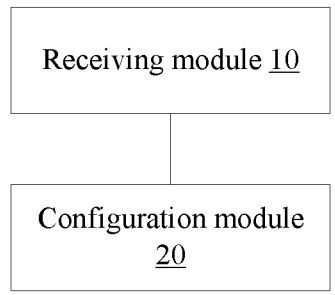
FIG. 4 is a structural diagram of a D2D resource configuration apparatus according to an embodiment of the present disclosure.

FIG. 4 is a structural diagram of a D2D resource configuration apparatus according to an embodiment of the present disclosure. As shown in FIG. 4, the apparatus includes a receiving module 10 and a configuration module 20. The receiving module 10 is arranged to receive D2D resource configuration information sent by a D2D control node. The configuration module 20 is coupled to the receiving module 10, and arranged to configure D2D resources according to the D2D resource configuration information.

The D2D control node is a node for controlling a D2D process.

In an implementation mode of the embodiments of the present disclosure, the D2D control node includes: a base station, a UE executing a resource configuration function, or a relay node.

In an implementation mode of the embodiments of the present disclosure, the above-mentioned apparatus further includes a first sending module. The first sending module is arranged to send one of: a message containing D2D resource configuration request information, a message containing D2D resource reconfiguration request information, and a message containing D2D resource release request information.

In an implementation mode of the embodiments of the present disclosure, the above-mentioned apparatus further includes a second sending module. The second sending module is arranged to send D2D resource configuration completion to the D2D control node.

In an implementation mode of the embodiments of the present disclosure, the D2D resource configuration information includes at least one of: D2D configuration setup information corresponding to a resource allocation mode; D2D configuration modification information corresponding to a resource allocation mode; and D2D configuration release information corresponding to a resource allocation mode.

In an implementation mode of the embodiments of the present disclosure, the resource allocation mode includes: a first resource allocation mode in which at least one D2D resource pool is allocated for a UE; and/or a second resource allocation mode in which dedicated D2D resource is allocated for a UE.

In an implementation mode of the embodiments of the present disclosure, the D2D resource configuration information corresponding to the first resource allocation mode includes one or any combination of: first resource configuration indication, D2D discovery/communication indication, validity period of first resource configuration, priority of first resource configuration, D2D resource pool information, which corresponds to the first resource allocation mode, of a serving cell, and D2D resource pool information, which corresponds to the first resource allocation mode, of one or more neighbouring cells.

In an implementation mode of the embodiments of the present disclosure, the D2D resource configuration information corresponding to the second resource allocation mode includes one or any combination of: a second resource configuration indication, a D2D discovery/communication indication, a validity period of second resource configuration, a priority of second resource configuration, D2D transmission resource information, which corresponds to the second resource allocation mode, of a serving cell, D2D resource pool information, which corresponds to a second resource allocation mode, of one or more neighbouring cells, a D2D Cell Radio Network Temporary Identity, a D2D Semi-Persistent Cell Radio Network Temporary Identity, a D2D semi-persistent scheduling interval, a D2D semi-persistent scheduling frame and/or subframe offset, and a D2D semi-persistent scheduling subframe mode.

In an implementation mode of the embodiments of the present disclosure, the D2D resource pool information includes: a D2D discovery resource pool and/or a D2D communication resource pool.

In an implementation mode of the embodiments of the present disclosure, the D2D resource configuration request information includes one or any combination of: a D2D discovery/communication indication, a D2D capability/inclination indication of a UE, a D2D communication group identifier, a UE priority, a bearer priority of a UE, a logic channel priority of a UE, a periodicity/one-shot indication, a duration, a measurement result of resources corresponding to a resource allocation mode, a cellular radio resource management measurement result, and a resource type.

In an implementation mode of the embodiments of the present disclosure, the resource type includes at least one of: transmission resource/resource pool information of a serving cell, reception resource/resource pool information of a serving cell, transmission resource/resource pool information of one or more neighbouring cells, and reception resource/resource pool information of one or more neighbouring cells, wherein the transmission resource/resource pool information or the reception resource/resource pool information is divided into first resource configuration information and second resource configuration information.

In an implementation mode of the embodiments of the present disclosure, the D2D capability/inclination indication of the UE includes: a resource allocation mode supported/inclined to use by the UE.

In an implementation mode of the embodiments of the present disclosure, the configuration module 20 is arranged to perform one of the following processing.

When the D2D resource configuration information contains D2D transmission resource configuration setup and/or modification information corresponding to the first resource allocation mode, for D2D discovery, the UE in a connected state acquires D2D resources for D2D transmission in a contention-based way according to D2D transmission resource pool information corresponding to the first resource allocation mode; when receiving D2D transmission resource pool information corresponding to the first resource allocation mode or when entering an idle state, the UE starts a validity timer for D2D transmission resource configuration corresponding to the first resource allocation mode, before the timer expires, the UE continues acquiring, for D2D discovery, D2D resources for D2D transmission in the contention-based way according to the D2D transmission resource pool corresponding to the first resource allocation mode, and after the timer expires, the UE releases D2D transmission resource configuration corresponding to the first resource allocation mode.

When the D2D resource configuration information contains D2D transmission resource configuration setup and/or modification information corresponding to the first resource allocation mode, for D2D communication, the UE acquires D2D resources for D2D communication in a contention-based way according to a D2D transmission resource pool corresponding to the first resource allocation mode.

When the D2D resource configuration information contains D2D transmission resource configuration setup and/or modification information corresponding to the second resource allocation mode, for D2D discovery, the UE acquires D2D resources for D2D discovery message transmission according to D2D transmission resources corresponding to the second resource allocation mode.

When the D2D resource configuration information contains D2D transmission resource configuration setup and/or modification information corresponding to the second resource allocation mode, for D2D communication, the UE initiates a D2D scheduling request or a D2D buffer state report, or the UE waits for the D2D control node to send D2D resource grant or D2D semi-persistent scheduling activation information.

When the D2D resource configuration information contains D2D reception resource configuration setup and/or modification information corresponding to the first resource allocation mode and/or the second resource allocation mode, the UE monitors a D2D reception resource pool corresponding to the first resource allocation mode and/or the second resource allocation mode.

When the D2D resource configuration information contains D2D reception resource configuration setup and/or modification information corresponding to the first resource allocation mode and/or the second resource allocation mode, for D2D discovery, the UE in a connected state performs D2D transmission by using D2D transmission resources corresponding to the second resource allocation mode; when receiving D2D transmission resource pool information corresponding to the first resource allocation mode or when entering an idle state, the UE starts a validity timer for D2D transmission resource configuration corresponding to the first resource allocation mode, before the timer expires, the UE acquires D2D resources for D2D transmission in a contention-based way according to a D2D transmission resource pool corresponding to the first resource allocation mode, and after the timer expires, the UE releases D2D transmission resource configuration corresponding to the first resource allocation mode.

When the D2D resource configuration information contains D2D reception resource configuration setup and/or modification information corresponding to the first resource allocation mode and/or the second resource allocation mode, for D2D communication, the UE selects a high-priority resource configuration mode for D2D communication. For example, when the cell radio resource management measurement result is higher than a preconfigured threshold, D2D transmission resources corresponding to the second resource allocation mode have a high priority, and when the cell radio resource management measurement result is lower than the preconfigured threshold, D2D transmission resources corresponding to the first resource allocation mode have a high priority.

When the D2D resource configuration information contains D2D resource configuration release information corresponding to the first resource allocation mode and/or the second resource allocation mode, the UE releases D2D resource configuration information corresponding to the first resource allocation mode and/or the second resource allocation mode.

Figure 5:
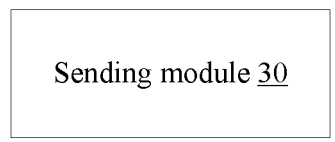
FIG. 5 is a structural diagram of a D2D resource allocation apparatus according to an embodiment of the present disclosure.

FIG. 5 is a structural diagram of a D2D resource allocation apparatus according to an embodiment of the present disclosure. The apparatus is located on a D2D control node. As shown in FIG. 5, the apparatus includes a sending module 30. The sending module 30 is arranged to send D2D resource configuration information to a UE.

The D2D control node is a node for controlling a D2D process.

In an implementation mode of the embodiments of the present disclosure, the D2D control node includes: a base station, a UE executing a resource configuration function, or a relay node.

In an implementation mode of the embodiments of the present disclosure, the D2D resource configuration information includes at least one of: D2D configuration setup information corresponding to a resource allocation mode; D2D configuration modification information corresponding to a resource allocation mode; and D2D configuration release information corresponding to a resource allocation mode.

In an implementation mode of the embodiments of the present disclosure, the resource allocation mode includes: a first resource allocation mode in which at least one D2D resource pool is allocated for a UE; and/or a second resource allocation mode in which dedicated D2D resource is allocated for a UE.

In an implementation mode of the embodiments of the present disclosure, the D2D resource configuration information corresponding to the first resource allocation mode includes one or any combination of: first resource configuration indication, D2D discovery/communication indication, validity period of first resource configuration, priority of first resource configuration, D2D resource pool information, which corresponds to the first resource allocation mode, of a serving cell, and D2D resource pool information, which corresponds to the first resource allocation mode, of one or more neighbouring cells.

In an implementation mode of the embodiments of the present disclosure, the D2D resource configuration information corresponding to the second resource allocation mode includes one or any combination of: a second resource configuration indication, a D2D discovery/communication indication, a validity period of second resource configuration, a priority of second resource configuration, D2D transmission resource information, which corresponds to the second resource allocation mode, of a serving cell, D2D resource pool information, which corresponds to a second resource allocation mode, of one or more neighbouring cells, a D2D Cell Radio Network Temporary Identity, a D2D Semi-Persistent Cell Radio Network Temporary Identity, a D2D semi-persistent scheduling interval, a D2D semi-persistent scheduling frame and/or subframe offset, and a D2D semi-persistent scheduling subframe mode.

In an implementation mode of the embodiments of the present disclosure, the D2D resource pool information includes: a D2D discovery resource pool and/or a D2D communication resource pool.

In an implementation mode of the embodiments of the present disclosure, the above-mentioned apparatus further includes a receiving module. The receiving module is arranged to receive, from the UE, one of: a message containing D2D resource configuration request information, a message containing D2D resource reconfiguration request information, and a message containing D2D resource release request information.

In an implementation mode of the embodiments of the present disclosure, the above-mentioned apparatus further includes a first determination module. The first determination module is arranged to determine, before the D2D configuration release information is sent to the UE, at least one of the following: receiving a message containing D2D resource release information from the UE; when a D2D resource pool, which corresponds to a second resource allocation mode, of the D2D control node is updated, determining that affected D2D resources allocated by to UE need to be released; determining that capability and/or authorization information of the UE changes, and configured D2D resources are not allowed to be used anymore; and when resources, which correspond to a second resource allocation mode, of a low-priority UE are pre-empted, determining that the D2D resources corresponding to the second resource allocation mode allocated for the low-priority UE need to be released.

In an implementation mode of the embodiments of the present disclosure, the above-mentioned apparatus further includes a second determination module. The second determination module is arranged to determine, before the D2D configuration modification information is sent to the UE, at least one of the following: receiving a message containing D2D resource configuration/reconfiguration request information from the UE; and when a D2D resource pool, which corresponds to the first resource allocation mode and/or the second resource allocation mode, of the D2D control node is updated, determining that affected D2D resources allocated to the UE need to be modified.

In an implementation mode of the embodiments of the present disclosure, the sending module 30 includes a judgement unit and a sending unit. The judgement unit is arranged to judge whether to configure D2D resources for the UE. The sending unit is arranged to, when the judgement unit judges to configure the D2D resources for the UE, configure the D2D resources for the UE, and send D2D resource configuration information of the configured D2D resources to the UE.

In an implementation mode of the embodiments of the present disclosure, the judgement unit is arranged to judge whether to configure the D2D resources for the UE according to at least one of a D2D resource load, a D2D authorization indication of the UE, a D2D capability/inclination indication of the UE, a UE priority, a bearer priority of the UE, and a logic channel priority of the UE.

In an implementation mode of the embodiments of the present disclosure, the judgement unit is arranged to judge, according to a pre-acquired D2D authorization indication of the UE, whether the UE passes D2D resource configuration authorization and which type of D2D resources is authorized to be used by the UE.

In an implementation mode of the embodiments of the present disclosure, the judgement unit is arranged to determine, according to a pre-acquired D2D capability of the UE, which type of D2D resources is to be used by the UE.

In an implementation mode of the embodiments of the present disclosure, the D2D capability of the UE includes: a resource allocation mode supported by the UE.

In an implementation mode of the embodiments of the present disclosure, the judgement unit is arranged to configure the D2D resources for the UE according to a D2D resource load. When D2D resources corresponding to a second resource allocation mode do not have enough available resources, the D2D control node configures D2D resources corresponding to a first resource allocation mode for the UE. In this embodiment, the first resource allocation mode is a resource allocation mode in which at least one D2D resource pool is allocated for the UE, and the second resource allocation mode is a resource allocation mode in which dedicated D2D resource is allocated for the UE.

In an implementation mode of the embodiments of the present disclosure, the judgement unit is arranged to configure the D2D resources for the UE according to a D2D resource load. When D2D resources corresponding to a second resource allocation mode do not have enough available resources, it is judged whether a priority of the UE and/or a bearer priority of the UE satisfy/satisfies predetermined conditions. When the predetermined conditions are satisfied, the D2D control node pre-empts D2D resources, which correspond to a second resource allocation mode, of a low-priority UE and/or a low-bearer-priority UE. When the predetermined conditions are not satisfied, D2D resources corresponding to a first resource allocation mode are configured for the UE.

By means of the embodiments of the present disclosure, a D2D UE can be configured with appropriate D2D resources as required according to the situation of the UE, thereby ensuring proper execution of D2D transmission. The method may be applied to both D2D discovery and D2D communication. The UE can be quickly and flexibly configured with D2D resources as required by means of a simple flow, thereby ensuring proper execution of subsequent D2D communication.

An exemplary implementation mode of the embodiments of the present disclosure will be described below.

Currently, two resource allocation modes, i.e., Type 1 and Type 2, respectively corresponding to the above-mentioned first resource allocation mode and second resource allocation mode, are defined for D2D discovery. Similarly, two resource allocation modes, i.e., Mode 1 and Mode 2, respectively corresponding to the second resource allocation mode and the first resource allocation mode described in Background, are defined for D2D communication.

As for the above-mentioned two resource allocation modes, a systematic and complete solution for a D2D resource allocation method for a specific D2D UE is not provided in the related art. In view of this, the embodiments of the present disclosure provide resource configuration methods and apparatuses for a D2D communication system. By means of the method provided in the embodiments of the present disclosure, a base station can configure appropriate D2D resources for a D2D UE as required according to the situation of the UE, thereby ensuring proper execution of D2D transmission.

Embodiment 1

The present embodiment provides a configuration setup, update and release process of D2D discovery resources, which will be elaborated below with Example 1 to Example 3.

Example 1

Figure 6:
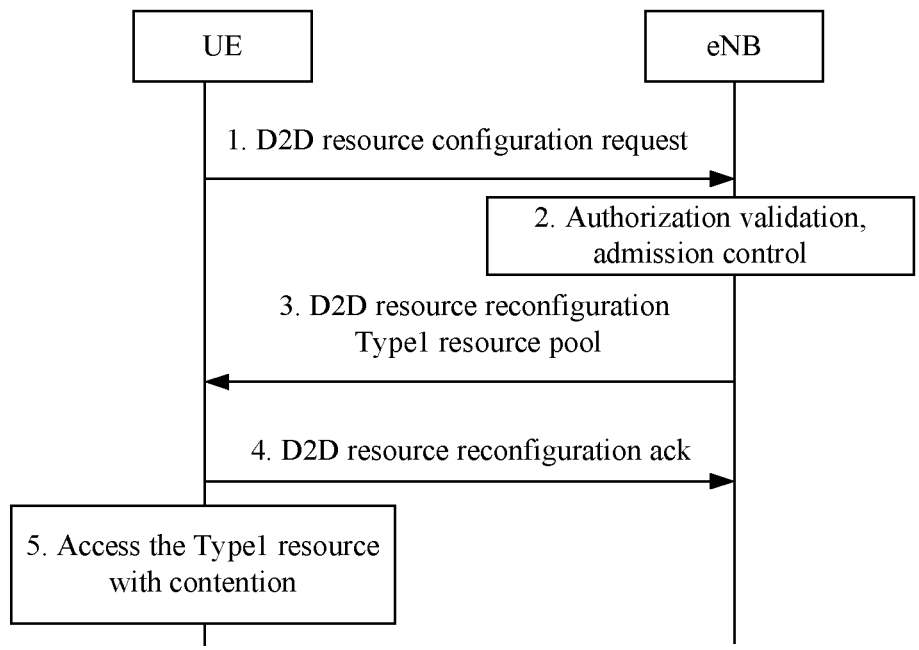
FIG. 6 is a flowchart of D2D discovery Type 1 resource configuration setup according to an example 1 of an embodiment of the present disclosure.

In a commercial application scenario, Mary and John possess UE1 and UE2 having a D2D discovery function. Each of UE1 and UE2 is located in a D2D discovery range of the other one of UE1 and UE2. UE1 wants to perform D2D discovery, and therefore sends a D2D resource configuration request message to an eNB. The D2D resource configuration request message may contain a D2D discovery indication, a priority of the D2D UE, a capability of the D2D UE, a periodicity/one-shot indication, a duration, and the like, as shown in FIG. 6.

The eNB performs authorization validation on UE1 according to stored context information of UE1. Suppose D2D UE1 cannot pass the authorization validation, the eNB sends a D2D configuration failure message, in which a reject cause is indicated as non-passed authorization validation, to UE1. If the authorization validation is passed and UE1 can only use Type 1 resources due to an authorization validation indication or a capability indication of the D2D UE or current Type overload, the eNB sends a D2D resource configuration message, which contains Type 1 transmission resource pool information, to UE1. The D2D resource configuration message may further contain Type 1 reception resource pool information and Type 2 reception resource pool information. Optionally, the D2D resource configuration information may have a validity period. In addition, the D2D resource configuration information may further contain QoS information of D2D UE1 such as priority and MBR. Here, the eNB may acquire the information in a UE context from an MME. Alternatively, the information may also be acquired from NAS signalling.

If there are multiple Type 1 resource pools and different Type 1 resource pools are divided according to different application types, different D2D UE priorities and the state of the D2D UE, the eNB may send only a specific resource pool, such as a resource pool corresponding to a specific application, according to a D2D resource request. Or, the eNB configures a plurality of Type 1 resource pools for the UE simultaneously, corresponding to different sending states respectively. For example, a Type 1 resource pool is used in correspondence to a connected state, and another Type 1 resource pool is used in correspondence to an idle state. In addition, the eNB may send Type 1 and/or Type 2 reception resource pool information of one or more neighbouring cells to the UE.

After acquiring the D2D resource configuration, UE1 sends a D2D resource configuration acknowledgment message to the eNB, and then acquires resources for D2D transmission from the Type 1 resource pool in a contention-based way according to the received Type 1 transmission resource pool information. The QoS information acquired by D2D UE1 may affect a resource contention operation of D2D UE1. For example, different QC's may correspond to different backoff durations and carrier sensing durations. In addition, D2D UE1 may monitor resources acquired by itself within a unit time, thereby guaranteeing that the acquired resources do not exceed MBR. Moreover, UE1 may monitor a D2D discovery message according to the Type 1 reception resource pool and/or Type 2 reception resource pool information of a present cell and a neighbouring cell contained in the D2D resource configuration information.

D2D UE1 may store the acquired Type 1 and/or Type 2 resource pool information of the accessed cell and the neighbouring cell as well as QoS information of the UE, for executing D2D discovery the next time when accessing the cell or getting close to the cell. Optionally, after UE1 enters an idle state, this resource pool configuration information may be provided with a validity period. If the validity period expires, D2D UE1 deletes the information.

Example 2

Figure 7:
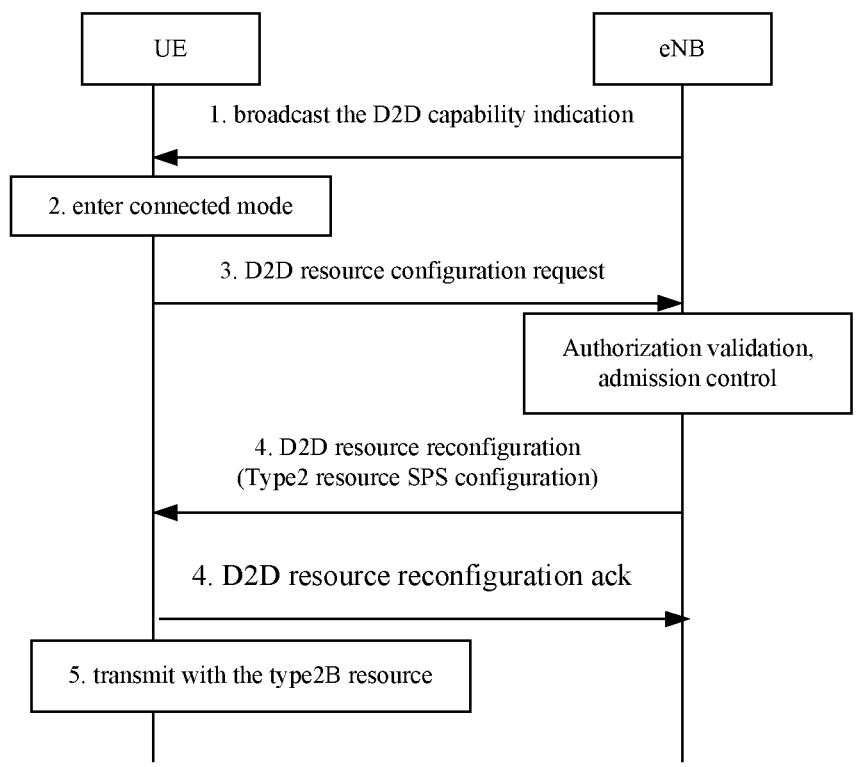
FIG. 7 is a flowchart of D2D discovery Type 2B resource configuration setup according to an example 2 of an embodiment of the present disclosure.

In a commercial application scenario, Mary and John possess UE1 and UE2 having a D2D discovery function. Each of UE1 and UE2 is located in a D2D discovery range of the other one of UE1 and UE2. An eNB sends a D2D supporting indication in an SIB broadcast message. After acquiring the information, UE1 in an idle state wants to perform D2D discovery, and therefore UE1 enters a connected state firstly and sends a D2D resource configuration request message to the eNB. The D2D resource configuration request message may contain a D2D discovery indication, a capability of the D2D UE, an application type of the D2D UE, a priority of the D2D UE, a periodicity/one-shot indication, a duration, and the like, as shown in FIG. 7.

Figure 8:
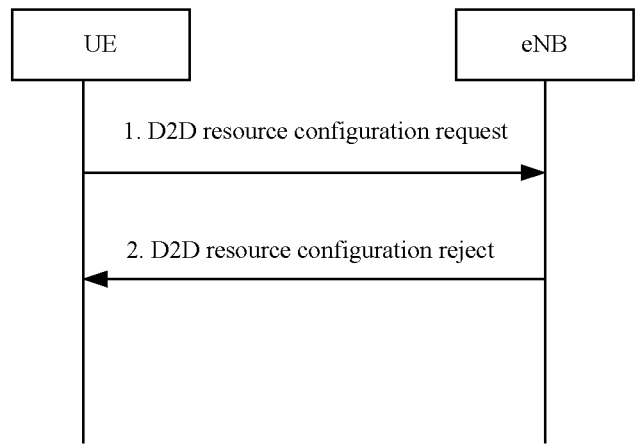
FIG. 8 is a flowchart of D2D discovery resource configuration failure according to an example 2 of an embodiment of the present disclosure.

After receiving the D2D resource configuration request message, the eNB performs authorization validation and admission control. If there are enough Type 2 resources, the eNB allocates resources for the D2D UE according to the application type of the D2D UE, the periodicity/one-shot indication and the duration. If there are not enough resources, the eNB further judges whether D2D resources of other UEs can be pre-empted according to the priority of the D2D UE (here, the priority corresponding to the pre-empted resources may be acquired in a UE context from an MME by the eNB, and similarly, QoS information such as QCI, ARP and MBR corresponding to D2D may also be acquired from the MME). If the UE can pre-empt resources of other UEs, the eNB sends a D2D resource reconfiguration message to a UE of which resources are pre-empted (the UE is required to release Type 2B resources thereof). After an acknowledgement message returned by the UE of which resources are pre-empted is received, the eNB sends a resource reconfiguration message to the D2D UE requesting for resources. The message contains a specific Type 2 transmission resource time and frequency domain position, period, duration and the like. If the priority of the D2D UE is insufficient to pre-empt resources of other UEs, the eNB sends a D2D resource configuration/reconfiguration message, which only contains Type 1 transmission resource information, to the D2D UE. If the eNB is not configured with Type 1 resources, the eNB sends a resource configuration reject message to the UE, a cause indicating that there are not enough resources, as shown in FIG. 8. Optionally, the resource configuration reject message may carry a prohibition timer, requiring the UE not to repeatedly send a D2D resource configuration request message before the prohibition timer expires.

Example 3

Figure 9:
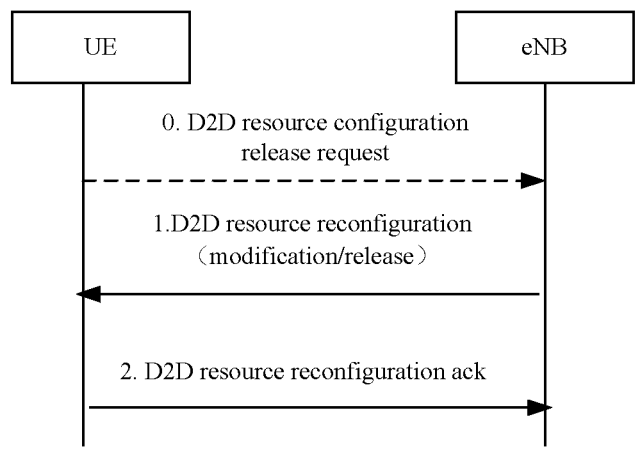
FIG. 9 is a flowchart of D2D discovery resource configuration modification/release according to an example 3 of an embodiment of the present disclosure.

If the following situation occurs, a reconfiguration flow for D2D resources will be triggered to release or update D2D resource configuration. After an eNB receives a resource release request sent by a UE, the eNB reconfigures (releases) resources. When a Type 2 resource pool changes, the eNB reconfigures (releases/updates) resources used by an involved D2D UE. When Type 2 resources of a low-priority D2D UE are pre-empted, the eNB sends a D2D resource reconfiguration (release) message to the low-priority D2D UE to make the low-priority D2D UE release the Type 2 resources and turn to use Type 1 resources if possible. If the capability/authorization information of the D2D UE changes, the eNB reconfigures the resources used by the D2D UE. A specific flow is as shown in FIG. 9.

Embodiment 2

The present embodiment provides a configuration setup, update and release process of D2D communication resources, which will be elaborated below with Example 4 to Example 10.

Example 4

In a public security scenario, Officers A, B, C and D use public security UE1, UE2, UE3 and UE4 having D2D functions. Officers A, B, C and D all subscribe for public security service, and UE1, UE2 and UE3 are all configured to belong to a D2D communication group X. After Officers A, B, C and D reach a rescue spot, UEs thereof are not within a network coverage range. However, Each of UE1, UE2, UE3 and UE4 is located in D2D communication ranges of the other UEs in the four UEs.

Figure 10:
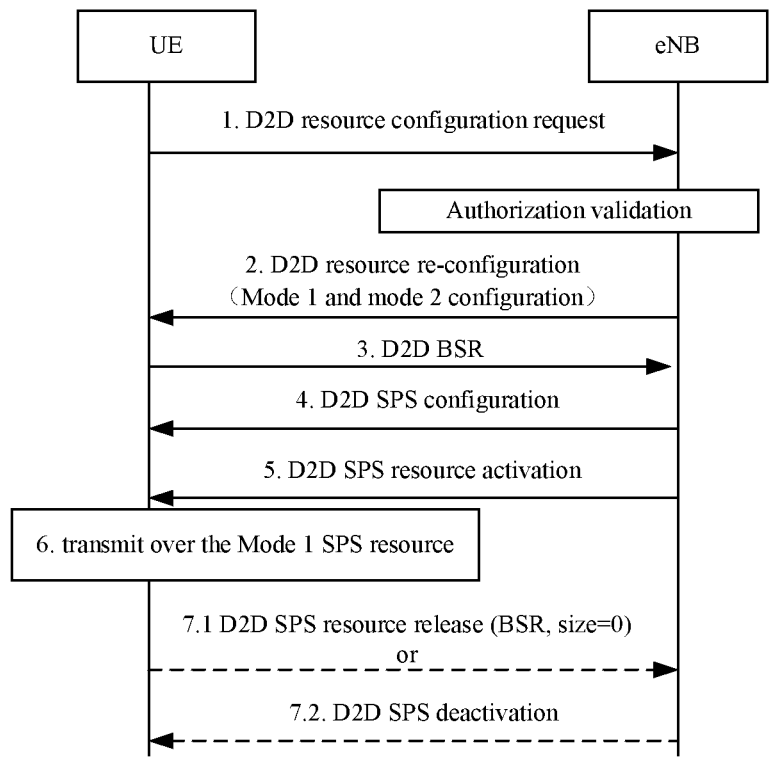
FIG. 10 is a flowchart of independent Mode 1 semi-persistent configuration and resource allocation for D2D communication according to an example 4 of an embodiment of the present disclosure.

At the rescue spot, Officer A expects to initiate a multicast call to inform other Officers nearby corresponding to the D2D communication group X of related information. UE1 of Officer A sends a D2D resource configuration request message to an eNB. The D2D resource configuration request message may contain information such as a D2D communication indication, a priority, a group identifier, a service type, a periodicity/one-shot indication or a duration, as shown in FIG. 10. The D2D resource configuration request message may be carried by an independent D2D resource configuration request, or may be carried in an RRCConnectionRequest/RRCConnectionSetupComplete message. The D2D resource configuration request information can be indicated by simply carrying a D2D communication indication in RRCConnectionRequest/RRCConnectionSetupComplete at this time.

The eNB performs authorization validation on UE1 according to stored context information of UE1. Suppose D2D UE1 cannot pass the authorization validation, the eNB sends a D2D resource configuration reject message, in which a reject cause is indicated as non-passed authorization validation, to UE1. If the authorization validation is passed, the eNB further judges the usage situation of Mode 1 resources. If there are enough resources, the eNB considers allocating resources for D2D UE1 according to the service type and periodicity/one-shot indication of D2D UE1. If there are not enough resources, the eNB further judges whether D2D UE1 can pre-empt D2D resources of other UEs according to the priority of D2D UE1 (here, the priority corresponding to the pre-empted resources may be acquired in a UE context from an MME by the eNB, and similarly, QoS information such as ARP and MBR corresponding to D2D may also be acquired from the MME). If UE1 can pre-empt resources of the other UEs, the eNB sends a D2D resource reconfiguration (release/modification) message to a UE of which resources are pre-empted. After an acknowledgement message returned by the UE of which resources are pre-empted is received, the eNB sends a resource reconfiguration message to D2D UE1 requesting for resources. The resource reconfiguration message contains transmission resource configuration setup of Mode 1 and Mode 2. If the priority of D2D UE1 is insufficient to pre-empt resources of other UEs, the eNB sends a message only containing transmission resource configuration setup of Mode 2 to D2D UE1. If the eNB does not support a Mode 2 resource pool, the eNB sends a D2D resource request reject message to UE1, a cause indicating that there are not enough resources. Optionally, the resource request reject message may carry a prohibition timer, requiring UE1 not to repeatedly send a D2D resource configuration request message before the prohibition timer expires. The D2D resource configuration request message may further contain reception resource pool information of Mode 1 and Mode 2 of the present cell and a neighbouring cell, and may contain a D2D RNTI of Mode 1 for subsequent D2D resource allocation. The message may be an independent D2D resource configuration/reconfiguration RRC signalling, or may be carried by an RRCConnectionSetup/RRCConnectionReconfiguration/RRCConnection resetup message. In addition, the eNB may also consider sending user plane configuration information to D2D UE1 by means of a D2D resource configuration message.

After receiving the message containing D2D resource configuration, D2D UE1 detects that the message contains transmission resource configuration information of Mode 1 and Mode 2, so D2D UE1 sends a BSR to the eNB, and reports a D2D buffer state report. The eNB judges whether to allocate semi-persistent resources or dynamic resources for a D2D UE according to the received BSR. If the semi-persistent resources are allocated, the eNB further issues SPS configuration to D2D UE1. The configuration contains information such as a D2D-SPS-RNTI, an SPS period and a subframe offset. After D2D UE1 completes the SPS configuration, the eNB may activate SPS resources. UE1 performs D2D SA transmission and data transmission by using corresponding resources according to a D2D grant scrambled by the received D2D-SPS-RNTI. D2D UE1 may actively require releasing the SPS resources as required, or the eNB sends an SPS de-activation command to UE1. Then, D2D UE1 stops D2D SPS transmission. In addition, D2D UE1 may monitor D2D transmission of other adjacent UEs and receive data according to the received reception resource configuration setup information of Mode 1 and Mode 2.

D2D UE1 may store D2D configuration information received from the eNB for executing D2D discovery the next time when accessing the cell or getting close to the cell. Optionally, this resource pool configuration information may have a validity period. If the validity period expires, D2D UE1 deletes the information.

Example 5

In a public security scenario, Officers A, B, C and D use public security UE1, UE2, UE3 and UE4 having D2D functions. Officers A, B, C and D all subscribe for public security service, and UE1, UE2 and UE3 are all configured to belong to a D2D communication group X. After Officers A, B, C and D reach a rescue spot, UEs thereof are not within a network coverage range. However, Each of UE1, UE2, UE3 and UE4 is located in D2D communication ranges of the other UEs in the four UEs.

Figure 11:
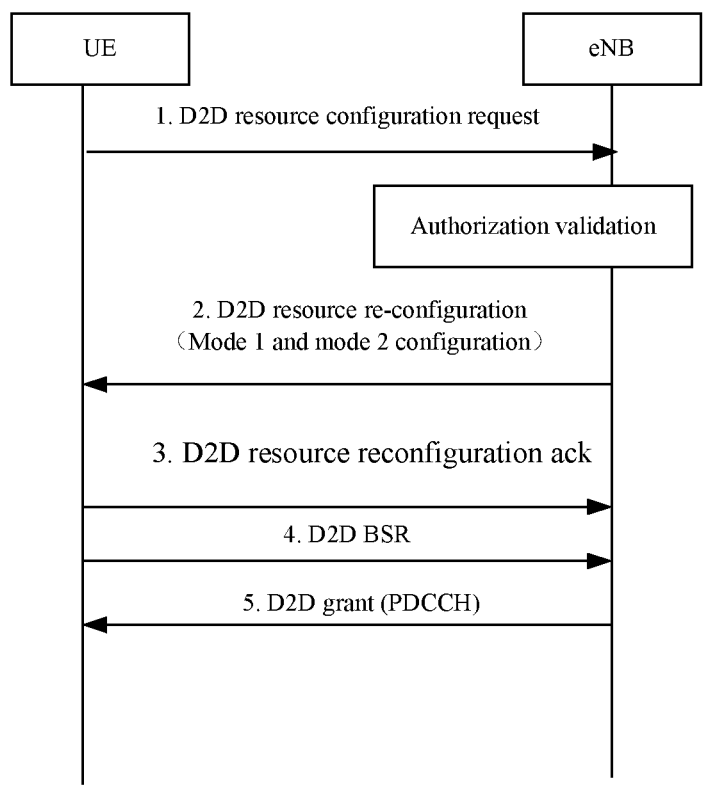
FIG. 11 is a flowchart of independent Mode 1 dynamic resource configuration and resource allocation for D2D communication according to an example 5 of an embodiment of the present disclosure.

At the rescue spot, Officer A expects to initiate a multicast call to inform other Officers nearby corresponding to the D2D communication group X of related information. UE1 of Officer A sends a D2D resource configuration request message to an eNB. The D2D resource configuration request message may contain information such as a D2D communication indication, a priority, a group identifier, a service type, a periodicity/one-shot indication or a duration, as shown in FIG. 11. The D2D resource configuration request message may be carried by an independent D2D resource configuration request, or may be carried in an RRCConnectionRequest/RRCConnectionSetupComplete message. The D2D resource configuration request information can be indicated by simply carrying a D2D communication indication in RRCConnectionRequest/RRCConnectionSetupComplete at this time.

The eNB performs authorization validation on UE1 according to stored context information of UE1. Suppose D2D UE1 cannot pass the authorization validation, the eNB sends a D2D resource configuration reject message, in which a reject cause is indicated as non-passed authorization validation, to UE1. If the authorization validation is passed, the eNB further judges the usage situation of Mode 1 resources. If there are enough resources, the eNB considers allocating resources for D2D UE1 according to the service type and periodicity/one-shot indication of D2D UE1. If there are not enough resources, the eNB further judges whether D2D UE1 can pre-empt D2D resources of other UEs according to the priority of D2D UE1 (here, the priority corresponding to the pre-empted resources may be acquired in a UE context from an MME by the eNB, and similarly, QoS information such as ARP and MBR corresponding to D2D may also be acquired from the MME). If UE1 can pre-empt resources of the other UEs, the eNB sends a D2D resource reconfiguration (release/modification) message to a UE of which resources are pre-empted. After an acknowledgement message returned by the UE of which resources are pre-empted is received, the eNB sends a resource reconfiguration message to D2D UE1 requesting for resources. The message contains transmission resource configuration setup of Mode 1 and Mode 2. If the priority of D2D UE1 is insufficient to pre-empt resources of other UEs, the eNB sends a message only containing transmission resource configuration setup of Mode 2 to D2D UE1. If the eNB does not support a Mode 2 resource pool, the eNB sends a D2D resource request reject message to UE1, a cause indicating that there are not enough resources. Optionally, the resource request reject message may carry a prohibition timer, requiring UE1 not to repeatedly send a D2D resource configuration request message before the prohibition timer expires. The D2D resource configuration request message may further contain reception resource pool information of Mode 1 and Mode 2 of the present cell and a neighbouring cell, and may contain a D2D RNTI of Mode 1 for subsequent D2D resource allocation. The message may be an independent D2D resource configuration/reconfiguration RRC signalling, or may be carried by an RRCConnectionSetup/RRCConnectionReconfiguration/RRCConnection resetup message.

In addition, the eNB may also consider sending user plane configuration information to D2D UE1 by means of a D2D resource configuration message. After receiving the message containing D2D resource configuration, D2D UE1 detects that the message contains transmission resource configuration information of Mode 1 and Mode 2, so D2D UE1 sends a BSR to the eNB, and reports a D2D buffer state report. The eNB judges whether to allocate semi-persistent resources or dynamic resources for a D2D UE according to the received BSR. If the eNB determines to dynamically allocate resources for D2D UE1, it is only necessary to directly send a D2D grant scrambled by a D2D-SPS-RNTI to UE1.

D2D UE1 may store D2D configuration information received from the eNB for executing D2D discovery the next time when accessing the cell or getting close to the cell. Optionally, this resource pool configuration information may have a validity period. If the validity period expires, D2D UE1 deletes the information.

Example 6

Figure 12:
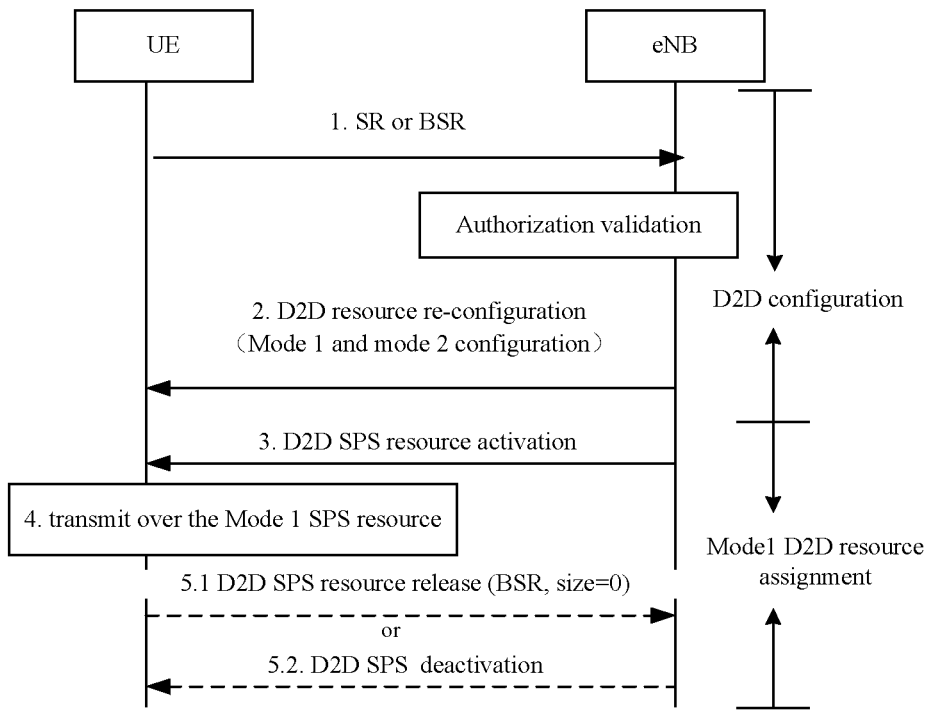
FIG. 12 is a flowchart of combined Mode 1 semi-persistent resource configuration and resource allocation for D2D communication according to an example 6 of an embodiment of the present disclosure.

In addition to the scenarios in which D2D resource configuration and resource request are independently completed described in Example 4 and Example 5, a combined signalling flow for D2D resource request and configuration may be considered, as shown in FIG. 12. An eNB may perform authorization validation on a D2D communication capability of UE according to an SR/BSR for D2D sent by D2D UE1. If the authorization validation is passed and there are enough Mode 1 resources, a configuration/reconfiguration message containing Mode 1 and Mode 2 transmission resources is sent to a UE. In this message, Mode 1 configuration may contain SPS and/or dynamic configuration. If the SPS configuration is contained, a D2D-SPS-RNTI, an SPS period and a subframe offset are contained. If the dynamic configuration is contained, a D2D-RNTI is contained. In addition, the configuration/reconfiguration message also contains Mode 1 and/or Mode 2 reception resource pool information of the present cell and a neighbouring cell.

After receiving the D2D resource configuration/reconfiguration message, D2D UE1 performs corresponding configuration, and then sends a resource configuration/reconfiguration acknowledgment message to the eNB. After the eNB receives the acknowledgment message, if determining to trigger the SPS configuration, the eNB activates SPS resources, and then D2D UE1 can perform D2D transmission by using corresponding SPS resources.

Example 7

In a public security scenario, Officers A, B, C and D use public security UE1, UE2, UE3 and UE4 having D2D functions. Officers A, B, C and D all subscribe for public security service, and UE1, UE2 and UE3 are all configured to belong to a D2D communication group X. After Officers A, B, C and D reach a rescue spot, UEs thereof are not within a network coverage range. However, Each of UE1, UE2, UE3 and UE4 is located in D2D communication ranges of the other UEs in the four UEs.

Figure 13:
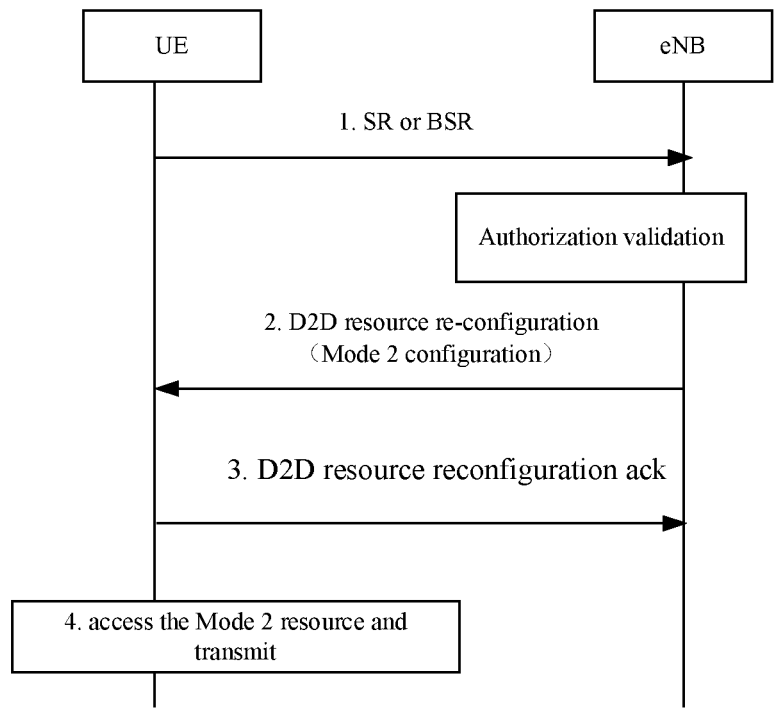
FIG. 13 is a flowchart of combined resource request and Mode 2 configuration for D2D communication according to an example 7 of an embodiment of the present disclosure.

At the rescue spot, Officer A expects to initiate a multicast call to inform other Officers nearby corresponding to the D2D communication group X of related information. UE1 of Officer A expects to initiate D2D communication, so UE1 sends an SR/BSR of D2D, as shown in FIG. 13. After receiving the SR/BSR, an eNB may perform authorization validation on a D2D communication capability of UE according to an SR/BSR for D2D sent by a D2D UE. Suppose D2D UE1 cannot pass the authorization validation, the eNB sends a D2D resource configuration reject message, in which a reject cause is indicated as non-passed authorization validation, to UE1. If the authorization validation is passed, the eNB further judges the usage situation of Mode 1 resources. If there are not enough resources and the priority of D2D UE1 is insufficient to pre-empt resources of other UEs, the eNB sends a message only containing Mode 2 transmission resource configuration to the D2D UE. After receiving the message only containing Mode 2 resource configuration, the D2D UE performs D2D transmission according to received D2D Mode 2 transmission resource pool information. In addition, D2D UE1 may monitor D2D transmission of other adjacent UEs and receive data according to the received reception resource configuration setup information of Mode 1 and Mode 2.

Example 8

In a commercial application scenario, Mary and John possess UE1 and UE2 having a D2D discovery function. Each of UE1 and UE2 is located in a D2D discovery range of the other one of UE1 and UE2.

Figure 14:
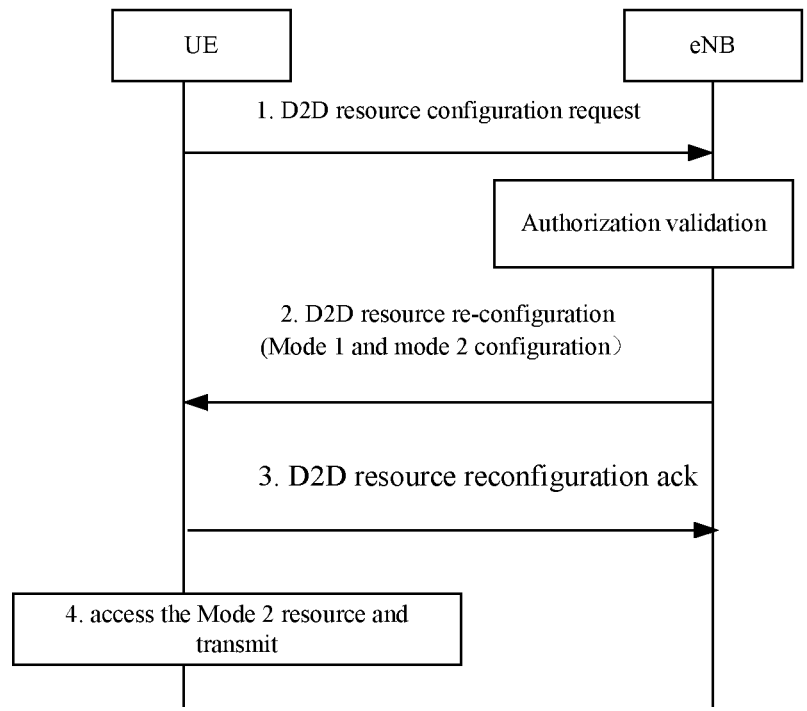
FIG. 14 is a flowchart of independent Mode 2 resource configuration and resource acquisition for D2D communication according to an example 8 of an embodiment of the present disclosure.

UE1 expects to initiate D2D communication with UE2, so UE1 sends a D2D resource configuration request message to an eNB, as shown in FIG. 14. The D2D resource configuration request message may contain information such as a D2D communication indication, a priority, a group identifier, a service type, a periodicity/one-shot indication or a duration. The D2D resource configuration request message may be carried by an independent RRC signalling, e.g., a dedicated D2D resource configuration/reconfiguration request message, or may be carried in an RRCConnectionSetupRequest message.

The eNB performs authorization validation on UE1 according to stored context information of UE1. Suppose D2D UE1 cannot pass the authorization validation, the eNB sends a D2D resource configuration reject message, in which a reject cause is indicated as non-passed authorization validation, to UE1. If the authorization validation is passed, the eNB further judges the usage situation of Mode 1 resources. If there are not enough resources and the priority of D2D UE1 is insufficient to pre-empt resources of other UEs, the eNB sends a message only containing Mode 2 transmission resource configuration to the D2D UE. After receiving the message only containing Mode 2 resource configuration, the D2D UE performs D2D transmission according to received D2D Mode 2 transmission resource pool information. In addition, D2D UE1 may monitor D2D transmission of other adjacent UEs and receive data according to the received reception resource configuration setup information of Mode 1 and/or Mode 2.

Example 9

Figure 15:
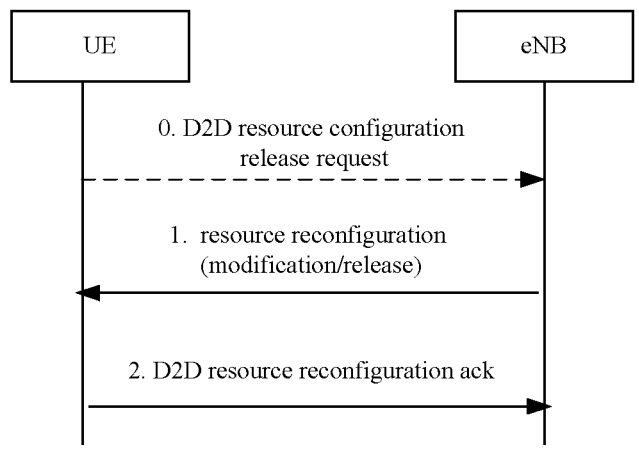
FIG. 15 is a flowchart of resource configuration modification/release for D2D communication according to an example 9 of an embodiment of the present disclosure.

If the following situation occurs, a reconfiguration flow for D2D resources will be triggered to release or update D2D resource configuration. After an eNB receives a resource release request sent by a UE, the eNB reconfigures (releases) resources. When a Mode 1/Mode 2 resource pool changes, the eNB reconfigures (releases/updates) resources used by an involved D2D UE. When Mode 1 resources of a low-priority D2D UE are pre-empted, the eNB sends a D2D resource reconfiguration (release) message to the low-priority D2D UE to make the low-priority D2D UE release the Mode 1 resources and turn to use Mode 2 resources if possible. If the capability/authorization information of the D2D UE changes, the eNB reconfigures the resources used by the D2D UE. After receiving a D2D resource configuration/reconfiguration message containing D2D resource modification or release, the D2D UE feeds back a D2D resource configuration/reconfiguration acknowledgment message to the eNB. A specific flow is as shown in FIG. 15.

If UE1 further judges that D2D resource configuration information only contains D2D transmission resource configuration modification corresponding to a first resource allocation mode, D2D resources are acquired for D2D transmission in a contention-based way from a D2D transmission resource pool corresponding to the first resource allocation mode updated by the UE. If UE1 judges that the D2D resource configuration information only contains D2D transmission resource configuration modification corresponding to a second resource allocation mode, UE1 initiates a D2D scheduling request/D2D buffer state report or the UE waits for a D2D control node to send D2D resource grant or semi-persistent D2D resource activation information. If UE1 judges that the D2D resource configuration information contains D2D reception resource configuration modification corresponding to the first resource allocation mode and/or the second resource allocation mode, the UE monitors a D2D reception resource pool corresponding to the updated first resource allocation mode and/or second resource allocation mode. If UE1 judges that the D2D resource configuration information contains D2D resource configuration modification corresponding to the first resource allocation mode and the second resource allocation mode, UE1 preferentially uses D2D transmission resources corresponding to the second resource allocation mode for D2D transmission. If UE1 judges that the D2D resource configuration information contains D2D resource configuration release information corresponding to the first resource allocation mode and/or the second resource allocation mode, UE1 releases D2D resource information corresponding to the first resource allocation mode and/or the second resource allocation mode, and monitors a corresponding resource pool no longer and sends over corresponding resources.

Example 10

In a process of using, by a D2D UE, Mode 1 resources to perform D2D discovery transmission, cellular communication is probably interfered. An eNB may preliminarily position an interference source UE by monitoring a D2D discovery message. In addition, Mode 1 resources of a low-priority D2D UE are probably pre-empted. In the two situations, the eNB may send a D2D resource allocation message to the UE, the message indicating that the D2D UE performs D2D transmission by using dedicated Type 2 resources. Mode switching in these two situations is initiated by the eNB.

Figure 16:
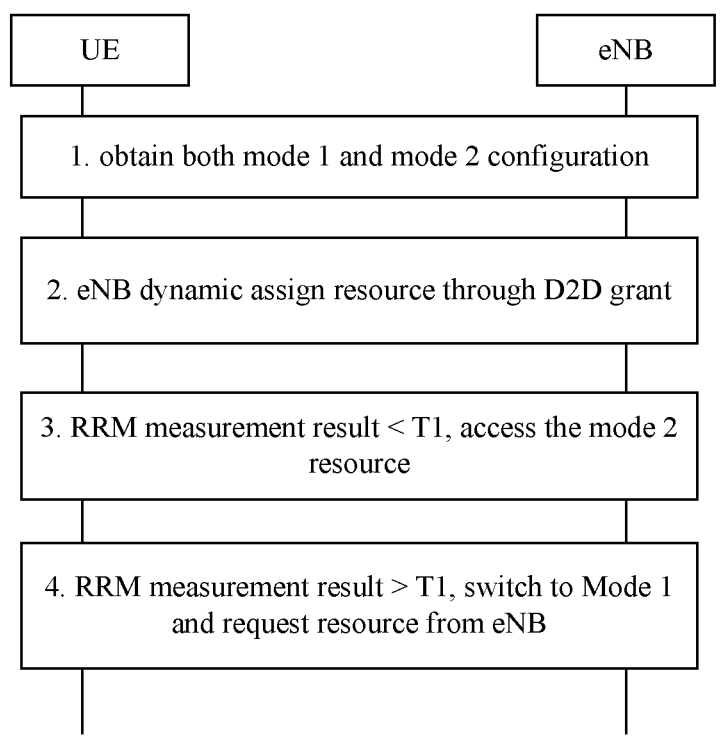
FIG. 16 is a flowchart of mode switching for D2D communication according to an example 10 of an embodiment of the present disclosure.

It may be considered to initiate mode switching by the UE. If the D2D UE detects that a signal of a serving cell becomes bad, Mode 1 SPS D2D resources allocated by the eNB happen to expire within this period and are not renewed in time, or no response to a D2D resource request message is returned, or the D2D UE is dynamically allocated with resources all the time, the D2D UE autonomously selects to use Mode 2 resources to perform D2D transmission. When the RRM of the serving cell becomes good, the D2D UE may continue to send a BSR request to the eNB to request the eNB to allocate resources, as shown in FIG. 16 specifically.

From the above description, it may be seen that the embodiments of the present disclosure achieve the following technical effects. A D2D UE can be configured with appropriate D2D resources as required according to the situation of the UE, thereby ensuring proper execution of D2D transmission. The method may be applied to both D2D discovery and D2D communication. The UE can be quickly and flexibly configured with D2D resources as required by means of a simple flow, thereby ensuring proper execution of subsequent D2D communication.

Obviously, those skilled in the art shall understand that all of the above-mentioned modules or steps in the embodiments of the present disclosure may be implemented by using a general calculation apparatus, may be centralized on a single calculation apparatus or may be distributed on a network composed of multiple calculation apparatuses. Alternatively, they may be implemented by using executable program codes of the calculation apparatuses. Thus, they may be stored in a storage apparatus and executed by the calculation apparatuses, the shown or described steps may be executed in a sequence different from the sequence under certain conditions, or they are manufactured into each integrated circuit module respectively, or multiple modules or steps therein are manufactured into a single integrated circuit module. Thus, the embodiments of the present disclosure are not limited to combination of any specific hardware and software.

The above is only the exemplary embodiments in the embodiments of the present disclosure, and not intended to limit the embodiments of the present disclosure. There may be various modifications and variations in the embodiments of the present disclosure for those skilled in the art. Any modifications, equivalent replacements, improvements and the like made within the principle of the embodiments of the present disclosure shall fall within the scope of protection of the embodiments of the present disclosure.

INDUSTRIAL APPLICABILITY

As above, by means of the above-mentioned embodiments and exemplary implementation modes, a UE receives D2D resource configuration information sent by a D2D control node; and the UE configures D2D resources according to the D2D resource configuration information, thereby implementing D2D resource configuration for a D2D UE.

What is claimed is:

1. A Device-to-Device (D2D) resource configuration method, comprising:
   receiving, by a User Equipment (UE), a D2D indication, broadcasted by a D2D control node;
   sending, by the UE in response to receiving the D2D indication, a message containing D2D resource configuration request information to the D2D control node, wherein the D2D resource configuration request information comprises a D2D communication group identifier;
   receiving, by the UE, first D2D resource configuration information sent by the D2D control node to configure at least one resource allocation mode from a plurality of resource allocation modes for the UE, in response to the D2D resource configuration request information comprising the D2D communication group identifier, wherein the first D2D resource configuration information comprises D2D setup information corresponding to the at least one resource allocation mode;
   configuring, by the UE, D2D resources according to the at least one resource allocation mode of the D2D setup information in the first D2D resource configuration information;
   sending, by the UE, a message containing D2D resource release request information to the D2D control node;
   receiving, by the UE, second D2D resource configuration information sent by the D2D control node, wherein the second D2D resource configuration information comprises D2D release information corresponding to the at least one resource allocation mode; and
   releasing, by the UE, the D2D resources according to the second D2D resource configuration information.

2. The method of claim 1, wherein the plurality of resource allocation modes comprise a first resource allocation mode in which at least one D2D resource pool is allocated for the UE.

3. The method of claim 1, wherein the plurality of resource allocation modes comprise a second resource allocation mode in which dedicated D2D resource is allocated for the UE.

4. The method of claim 2, wherein the first D2D resource configuration information corresponding to the first resource allocation mode comprises D2D resource pool information, which corresponds to the first resource allocation mode, of a serving cell.

5. The method of claim 3, wherein the first D2D resource configuration information corresponding to the second resource allocation mode comprises:
   D2D transmission resource information, which corresponds to the second resource allocation mode, of a serving cell; and
   a D2D Cell Radio Network Temporary Identity.

6. The method of claim 4, wherein the D2D resource pool information comprises:
   a D2D resource period;
   a D2D subframe offset; and
   a D2D resource time and frequency domain position.

7. The method of claim 2, wherein a D2D resource pool comprises:
   a D2D transmission resource pool; and
   a D2D reception resource pool.

8. The method of claim 2, wherein configuring the D2D resources according to the first D2D resource configuration information comprises when the first D2D resource configuration information contains D2D transmission resource configuration setup information corresponding to the first resource allocation mode, acquiring, by the UE, the D2D resources for D2D communication in a contention-based way according to a D2D transmission resource pool corresponding to the first resource allocation mode.

9. The method of claim 3, wherein configuring the D2D resources according to the first D2D resource configuration information comprises when the first D2D resource configuration information contains D2D transmission resource configuration setup information corresponding to the second resource allocation mode, initiating, by the UE, a D2D buffer state report, or waiting, by the UE, for the D2D control node to send D2D resource grant.

10. A Device-to-Device (D2D) resource configuration apparatus, comprising:
   a receiving module configured to:
      receive a D2D indication, broadcasted by a D2D control node;
      receive first D2D resource configuration information sent by the D2D control node to configure at least one resource allocation mode from a plurality of resource allocation modes for the UE, in response to D2D resource configuration request information, wherein the first D2D resource configuration information comprises D2D setup information corresponding to the at least one resource allocation mode; and
      receive second D2D resource configuration information sent by the D2D control node, wherein the second D2D resource configuration information comprises D2D release information corresponding to the resource allocation mode;

a sending module configured to:
  send, in response to receiving the D2D indication, a message containing the D2D resource configuration request information to the D2D control node, wherein the D2D resource configuration request information comprises a D2D communication group identifier; and
  send a message containing D2D resource release request information to the D2D control node; and
a configuration module configured to:
  configure D2D resources according to the at least one resource allocation mode of the D2D setup information in the first D2D resource configuration information; and
  release the D2D resources according to the second D2D resource configuration information.

11. The apparatus of claim 10, wherein the plurality of resource allocation modes comprise a first resource allocation mode in which at least one D2D resource pool is allocated for a UE.

12. The apparatus of claim 10, wherein the plurality of resource allocation modes comprise a second resource allocation mode in which dedicated D2D resource is allocated for a UE.

13. The apparatus of claim 11, wherein the first D2D resource configuration information corresponding to the first resource allocation mode comprises D2D resource pool information, which corresponds to the first resource allocation mode, of a serving cell.

14. The apparatus of claim 12, wherein the first D2D resource configuration information corresponding to the second resource allocation mode comprises:
  D2D transmission resource information, which corresponds to the second resource allocation mode, of a serving cell; and
  a D2D Cell Radio Network Temporary Identity.

15. The apparatus of claim 13, wherein the D2D resource pool information comprises:
  a D2D resource period;
  a D2D subframe offset; and
  a D2D resource time and frequency domain position.

16. The apparatus of claim 11, wherein a D2D resource pool comprises:
  a D2D transmission resource pool; and
  a D2D reception resource pool.

17. The apparatus of claim 11, wherein, the configuration module is further configured to acquire the D2D resources for D2D communication in a contention-based way according to a D2D transmission resource pool corresponding to the first resource allocation mode, when the first D2D resource configuration information contains D2D transmission resource configuration setup information corresponding to the first resource allocation mode.

18. The apparatus of claim 12, wherein, the configuration module is further configured to initiate a D2D buffer state report, or wait, by the UE, for the D2D control node to send D2D resource grant, when the first D2D resource configuration information contains D2D transmission resource configuration setup information corresponding to the second resource allocation mode.

* * * * *